(12) United States Patent
Carmean et al.

(10) Patent No.: US 11,125,316 B2
(45) Date of Patent: Sep. 21, 2021

(54) LUBRICANT FLUID SHROUD

(71) Applicant: DANA HEAVY VEHICLE SYSTEMS GROUP, LLC, Maumee, OH (US)

(72) Inventors: Daniel D. Carmean, Swanton, OH (US); Benjamin J. Passino, Maumee, OH (US); Shane T. Smith, Sylvania, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 16/980,453

(22) PCT Filed: Mar. 8, 2019

(86) PCT No.: PCT/US2019/021295
§ 371 (c)(1),
(2) Date: Sep. 14, 2020

(87) PCT Pub. No.: WO2019/177882
PCT Pub. Date: Sep. 19, 2019

(65) Prior Publication Data
US 2021/0088122 A1 Mar. 25, 2021

Related U.S. Application Data

(60) Provisional application No. 62/642,660, filed on Mar. 14, 2018.

(51) Int. Cl.
F16H 57/04 (2010.01)

(52) U.S. Cl.
CPC ..... *F16H 57/0409* (2013.01); *F16H 57/0423* (2013.01); *F16H 57/0457* (2013.01); *F16H 57/0483* (2013.01)

(58) Field of Classification Search
USPC ........................................................ 475/160
See application file for complete search history.

(56) References Cited

U.S. PATENT DOCUMENTS

| 5,505,112 | A | 4/1996 | Gee |
| 8,535,193 | B2 | 9/2013 | Weber |
| 2006/0048600 | A1 | 3/2006 | Taguchi |
| 2009/0023531 | A1* | 1/2009 | Hilker ................. F16H 57/0483 475/160 |
| 2009/0176614 | A1* | 7/2009 | Hilker ................. F16H 57/0427 475/160 |

(Continued)

FOREIGN PATENT DOCUMENTS

DE 102011089189 6/2013

*Primary Examiner* — Colby M Hansen
(74) *Attorney, Agent, or Firm* — Marshall & Melhorn, LLC

(57) ABSTRACT

A drive unit assembly having a shroud for use in a vehicle. The drive unit assembly includes a ring gear having an outermost surface, an innermost surface, a first side and a second side. A plurality of ring gear teeth circumferentially extend from at least a portion of the second side of the ring gear of the drive unit assembly. The shroud of the drive unit assembly includes a first shroud member that is integrally connected to at least a portion of a second shroud member. At least a portion of the ring gear is disposed within at least a portion of the shroud of the drive unit assembly.

20 Claims, 13 Drawing Sheets

(56) References Cited

U.S. PATENT DOCUMENTS

| | | | |
|---|---|---|---|
| 2011/0212805 A1* | 9/2011 | Hilker | F16H 57/0483 475/160 |
| 2014/0260790 A1 | 9/2014 | Passino | |
| 2015/0097073 A1 | 4/2015 | McPeak | |
| 2016/0377164 A1 | 12/2016 | Fast | |
| 2017/0130817 A1 | 5/2017 | Matsubara | |

* cited by examiner

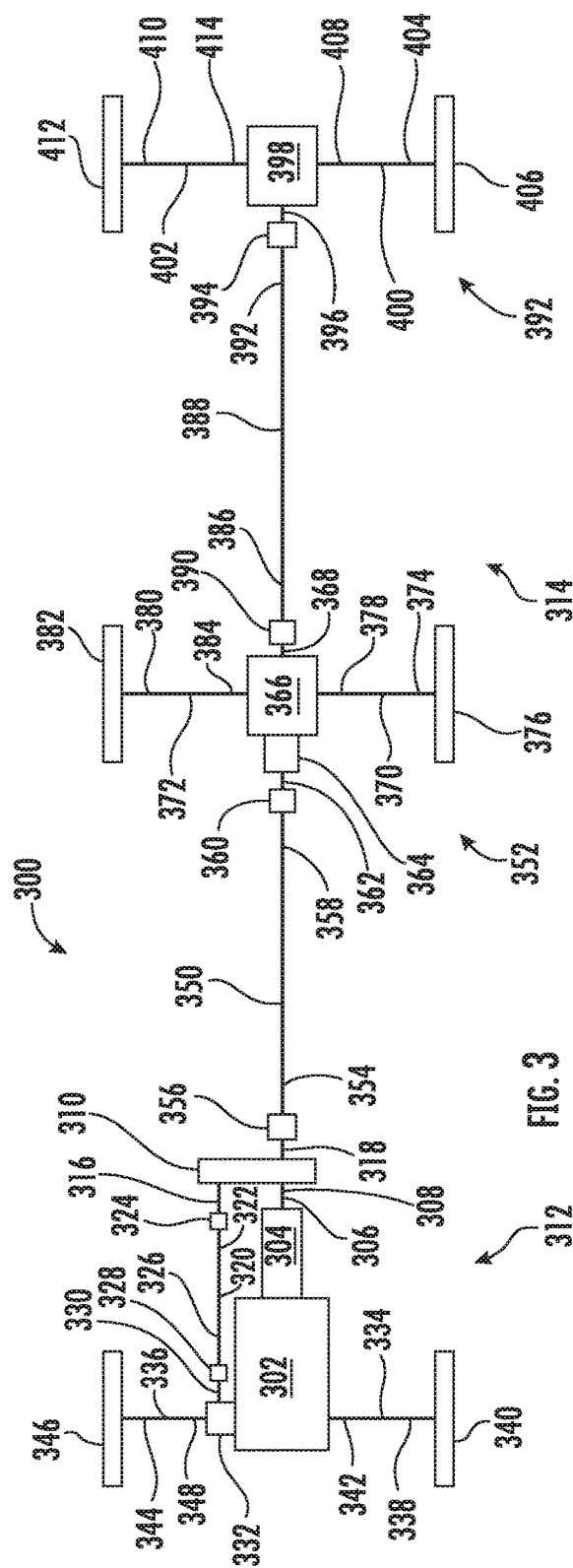
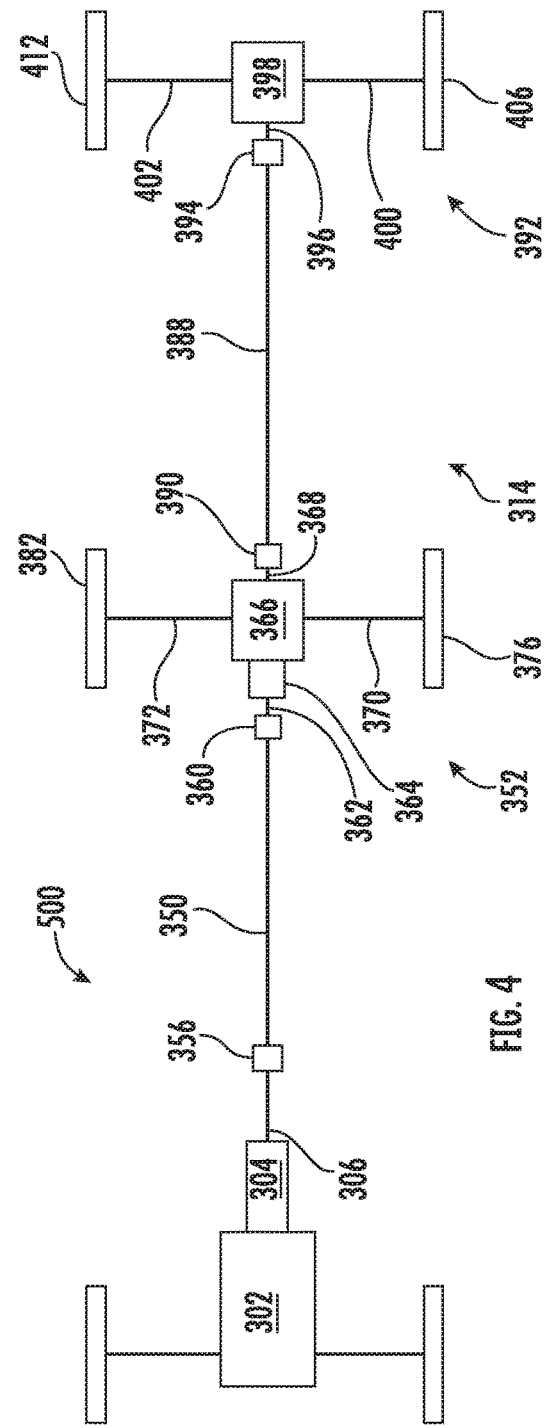

LUBRICANT FLUID SHROUD

CROSS-REFERENCE TO RELATED APPLICATIONS

The present application claims the benefit to U.S. Provisional Patent Application No. 62/642,660 filed on Mar. 14, 2018, which is incorporated herein by reference in its entirety.

FIELD OF THE DISCLOSURE

The present disclosure relates to a lubrication fluid shroud for use in a vehicle.

BACKGROUND OF THE DISCLOSURE

Various drive train systems are widely used in order to transmit an amount of rotational power generated by a source of rotational power to one or more driven components. For example, the source of rotational power may be an engine or motor that generates an amount of rotational power needed to drive one or more wheel assemblies.

Typically, a vehicle drive train includes the use of one or more drive unit assemblies that transmit an amount of the rotational power generated by the engine to the one or more wheel assemblies of the vehicle. A conventional drive unit assembly includes the use of one or more gears meshed together within a housing. In order to improve the overall life and durability of the drive unit assemblies, an amount of lubrication fluid is included within the housing to lubricate the gears of the drive unit assemblies. The problem with conventional drive unit assemblies is that they suffer from various parasitic and/or churning losses that result from the resistance offered by the gears rotating through the lubrication fluid. This reduces the overall efficiency of the drive unit assemblies and reduces the amount of rotational power that is transmitted from the engine to the wheels of the vehicle.

It would be advantageous to develop a drive unit assembly that has an improved overall efficiency. Additionally, it would be advantageous to develop a lubrication fluid shroud that limits the amount of lubrication fluid a gear rotates through thereby increasing the overall efficiency and the overall amount of rotational power transmitted from the engine to the wheels of the vehicle through the drive unit assembly.

SUMMARY OF THE DISCLOSURE

A drive unit assembly having a shroud for use in a vehicle. The drive unit assembly includes a ring gear having an outermost surface, an innermost surface, a first side and a second side. A plurality of ring gear teeth circumferentially extend from at least a portion of the second side of the ring gear of the drive unit assembly. The shroud of the drive unit assembly includes a first shroud member that is integrally connected to at least a portion of a second shroud member. At least a portion of the ring gear is disposed within at least a portion of the shroud of the drive unit assembly.

According to an aspect of the disclosure, the first shroud member may include an attachment portion integrally connected to at least a portion of an outer surface of a first bearing cap and/or an inner surface of a housing. Additionally, the second shroud member includes an attachment portion integrally connected to at least a portion of an outer surface of a second bearing cap and/or the inner surface of the housing.

According to any of the previous aspects of the disclosure, the second shroud member may further include a base portion having a first end, a second end, a first side portion, a second side portion and an intermediate portion interposed between the first and second side portions. At least a portion of the base portion of the second shroud member may be disposed outboard from the outermost surface of the ring gear and may have a shape that is complementary to at least a portion of the outermost surface of the ring gear.

According to any of the previous aspects of the disclosure, the base portion of the second shroud member may include a shroud attachment portion circumferentially extending from at least a portion of the first side portion of the base portion of the second shroud member.

According to any of the previous aspects of the disclosure, at least a portion of the first end of the base portion of the second shroud member may extend at an angle θ3 relative to a horizontal center-line C1 of the ring gear.

According to any of the previous aspects of the disclosure, the angle θ3 may be from approximately 5° to approximately 115°.

According to any of the previous aspects of the disclosure, at least a portion of the second end of the base portion of the second shroud member may be disposed directly adjacent to at least a portion of a ring gear.

According to any of the previous aspects of the disclosure, at least a portion of the base portion of the second shroud member may include a pinion gear receiving portion having a size and shape to receive at least a portion of the pinion gear.

According to any of the previous aspect of the disclosure, at least a portion of the pinion gear receiving portion extends inward from at least a portion of the second end of the base portion of the second shroud member through at least a portion of the intermediate portion of the base portion of the second shroud member, the first side portion of the base portion of the second shroud member and/or the shroud attachment portion of the base portion of the second shroud member.

According to any of the previous aspects of the disclosure, the second shroud member may include a first substantially straight portion circumferentially extending from at least a portion of the second side portion of the base portion of the second shroud member toward the ring gear. At least a portion of the first substantially straight portion may be disposed outboard from and directly adjacent to at least a portion of the first side of the ring gear.

According to any of the previous aspects of the disclosure, the second shroud member may further include a first substantially arcuate portion extending outboard away from the ring gear from an end of the first substantially straight portion opposite the base portion.

According to any of the previous aspects of the disclosure, the second shroud member may further include a second substantially straight portion extending inboard from an end of the first substantially arcuate portion opposite the first substantially arcuate portion. The second substantially straight portion of the second shroud member may be substantially perpendicular to or may be perpendicular to the first substantially straight portion of the second shroud member.

According to any of the previous aspects of the disclosure, the second shroud member may further include a second angularly bent portion extending from an end of the second substantially straight portion opposite the first angularly bent portion.

According to any of the previous aspects of the disclosure, the second shroud member may include a third substantially straight portion extending inboard from an end of the second arcuate portion opposite the second substantially straight portion. At least a portion of the third substantially straight portion of the second shroud member may be disposed directly adjacent to the first side of the ring gear.

According to any of the previous aspects of the disclosure, the third substantially straight portion of the second shroud member may further include a truncated portion having a bottom portion and a side portion wherein the bottom portion may be substantially parallel to the center-line C1 of the ring gear.

According to any of the previous aspects of the disclosure, the bottom portion of the truncated portion of the third substantially straight portion of the second shroud member may further include a second receiving portion, where the second receiving portion may be substantially arcuate in shape and extends outboard toward the base portion of the second shroud member.

According to any of the previous aspects of the disclosure, at least a portion of the attachment portion of the second shroud member may extend outboard from at least a portion of the side portion of the truncated portion of the third substantially straight portion of the second shroud member away from the ring gear.

According to any of the previous aspects of the disclosure, the first shroud member may include an outer periphery having a top portion and a bottom portion, where at least a portion of the bottom portion of the outer periphery may have a shape that is complementary to at least a portion of the first side portion of the base portion of the second shroud member.

According to any of the previous aspects of the disclosure, at least a portion of the bottom portion of the outer periphery of the first shroud member may be disposed inboard from and directly adjacent to an inner surface of the shroud attachment portion of the base portion of the second shroud member. Additionally, at least a portion of the first shroud member may be disposed directly adjacent to at least a portion of the second side of the ring gear. Furthermore, at least a portion of an outer surface of the first shroud member may be integrally connected to at least a portion of the shroud attachment portion of the base portion of the second shroud member forming a unitary shroud.

According to any of the previous aspects of the disclosure, the top portion of the outer periphery of the first shroud member may include a first end portion, a second end portion and an intermediate portion interposed between the first and second end portions. The first end portion of the top portion of the outer periphery of the first shroud member may include a fourth substantially straight portion that extends outboard at an angle $\theta1$ away from the ring gear.

According to any of the previous aspects of the disclosure, the second end portion of the top portion of the outer periphery of the first shroud member may include a fifth substantially straight portion, a fourth angularly bent portion and sixth substantially straight portion, where the fifth substantially straight portion may be connected to an end of the fourth angularly bent portion opposite the sixth substantially straight portion. Additionally, the fifth substantially straight portion of the first shroud member may extend at an angle $\theta2$ away from the ring gear.

According to any of the previous aspects of the disclosure, the angle $\theta2$ of the fifth substantially straight portion of the first shroud member may be substantially equal to the angle $\theta1$ of the fourth substantially straight of the first shroud member.

According to any of the previous aspects of the disclosure, the intermediate portion of the top portion of the outer periphery of the first shroud member may include the attachment portion having a first portion and a second portion extending outboard away from a fifth angularly bent portion away from the ring gear. The fifth angularly bent portion of the first shroud member may be connected to an end of the fourth substantially straight portion of the first shroud member opposite the base portion of the second shroud member. Additionally, the first and second portions of the attachment portion of the first shroud member may be separated from each other by a gap.

According to any of the previous aspects of the disclosure, the second portion of the attachment portion of the first shroud member may include an attachment arm extending toward the first portion of the attachment portion of the first shroud member. Additionally, the attachment arm of the second portion of the attachment portion of the first shroud member may include a seventh substantially straight portion, a sixth angularly bent portion, an eighth substantially straight portion, a seventh angularly bent portion and/or a ninth substantially straight portion, where the eighth substantially straight portion extends outboard from the sixth angularly bent portion toward the base portion of the second shroud member. Furthermore, the eighth substantially straight portion may be substantially perpendicular to or perpendicular to the ninth substantially straight portion of the second portion of the attachment portion of the first shroud member.

According to any of the previous aspects of the disclosure, the bottom portion of the outer periphery of the first shroud member may include a shroud attachment portion that is disposed outboard from at least a portion of the first side portion of the base portion of the second shroud member. At least a portion of the shroud attachment portion of the first shroud member may be integrally connected to at least a portion of the first side portion of the base portion of the second shroud member forming a unitary shroud.

According to any of the previous aspects of the disclosure, the first end portion of the top portion of the outer periphery of the first shroud member may include a tenth substantially straight portion extending from the ring gear at an angle $\theta4$ and the second end portion of the top portion of the first shroud member may include an eleventh substantially straight portion extending from the ring gear at an angle $\theta5$.

According to any of the previous aspects of the disclosure, the angle $\theta4$ of the tenth substantially straight portion of the first shroud member may be substantially equal to the angle $\theta5$ of the eleventh substantially straight portion of the first shroud member.

According to any of the previous aspects of the disclosure, the intermediate portion of the top portion of the outer periphery of the first shroud member may include a first substantially concave portion, a second substantially concave portion, a twelfth substantially straight portion and a thirteenth substantially straight portion. At least a portion of the first substantially concave portion may be connected to an end of the tenth substantially straight portion of the first shroud member opposite the base portion of the second shroud member. Additionally, at least a portion of the second substantially concave portion may be connected to an end of the eleventh substantially straight portion of the first shroud member opposite the base portion of the second shroud member. Furthermore, the twelfth substantially straight portion extends from an end of the first substantially concave portion opposite the tenth substantially straight portion of the first shroud member and the thirteenth substantially straight portion extends from an end of the second substantially concave portion opposite the eleventh substantially straight portion of the first shroud member.

According to any of the previous aspects of the disclosure, at least a portion of the first substantially concave portion and/or at least a portion of the second substantially concave portion of the first shroud member may extend inward toward the ring gear of the drive unit assembly. Additionally, at least a portion of the first substantially concave portion may be connected to at least a portion of the second substantially concave portion at a point within the body portion of the first shroud member. Furthermore, at least a portion of the twelfth substantially straight portion may be connected to at least a portion of the thirteenth substantially straight portion at a point within the body portion of the first shroud member.

According to any of the previous aspects of the disclosure, the twelfth substantially straight portion may extend outboard from the first substantially concave portion away from the ring gear at an angle θ6 and the thirteenth substantially straight portion may extend from the second substantially concave portion away from the ring gear at an angle θ7.

According to any of the previous aspects of the disclosure, the angle θ6 of the twelfth substantially straight portion of the first shroud member may be substantially equal to the angle θ7 of the thirteenth substantially straight portion of the first shroud member.

According to any of the previous aspects of the disclosure, the twelfth and thirteenth substantially straight portions of the first shroud member form a substantially conical shape, a substantially truncated conical shape, a substantially frustum shape and/or a substantially frusto-conical shape.

According to any of the previous aspects of the disclosure, the twelfth and thirteenth substantially straight portions of the first shroud member form one or more differential shield portions that may be disposed outboard from and directly adjacent to at least a portion of one or more apertures extending from an inner surface to an outer surface of a differential case.

According to any one of the previous aspects of the disclosure, the one or more differential shield portions of the first shroud member may aid in preventing an amount of lubrication fluid in a primary sump to come into direct contact with the differential case and/or a differential gear set disposed within the differential case. Additionally, the one or more differential shield portions of the first shroud member may aid in collecting an amount of lubrication fluid that is expelled from the differential case and direct the lubrication fluid collected to a secondary sump within the shroud assembly.

According to any of the previous aspects of the disclosure, the attachment portion of the first shroud member may be connected to at least a portion of an end of the twelfth and/or thirteenth substantially straight portions of the first shroud member opposite the first and/or second substantially concave portions of the first shroud member. Additionally, attachment portion of the first shroud member may extend outboard away from the ring gear.

According to any of the previous aspects of the disclosure, the shroud may further include one or more lubricant fluid apertures that are disposed in the body portion of the first shroud member, the base portion of the second shroud member and/or the first substantially straight portion of said the second shroud member. The one or more lubricant fluid apertures may aid in replenishing the amount of lubrication fluid disposed within a secondary sump within the shroud. Additionally, the one or more lubricant fluid apertures may be of a size and/or number in order to regulate the amount of flow of lubrication fluid from a primary sump and into the secondary sump. Furthermore the one or more lubricant fluid apertures may be of a size and/or number that aid in ensuring that the amount of lubrication fluid within the secondary sump of the shroud is consistently at a predetermined optimal operating level at all time when a drive unit assembly is in operation.

BRIEF DESCRIPTION OF THE DRAWINGS

The above, as well as other advantages of the present disclosure, will become readily apparent to those skilled in the art from the following detailed description when considered in light of the accompanying drawings in which:

FIG. 3 is a schematic top-plan view of view of yet another vehicle having one or more lubrication fluid shrouds according to an embodiment of the disclosure;

FIG. 4 is a schematic top-plan view of view of still yet another vehicle having one or more lubrication fluid shrouds according to an embodiment of the disclosure;

DETAILED DESCRIPTION OF THE DISCLOSURE

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments of the invention disclosed are not to be considered as limiting, unless expressly stated otherwise.

It is within the scope of this disclosure, and as a non-limiting example, that the lubrication fluid shroud disclosed herein may be used in automotive, off-road vehicle, all-terrain vehicle, construction, structural, marine, aerospace, locomotive, military, machinery, robotic and/or consumer product applications. Additionally, as a non-limiting example, the lubrication fluid shroud disclosed herein may also be used in passenger vehicle, electric vehicle, hybrid vehicle, commercial vehicle, autonomous vehicles, semi-autonomous vehicles and/or heavy vehicle applications.

Figure 1:
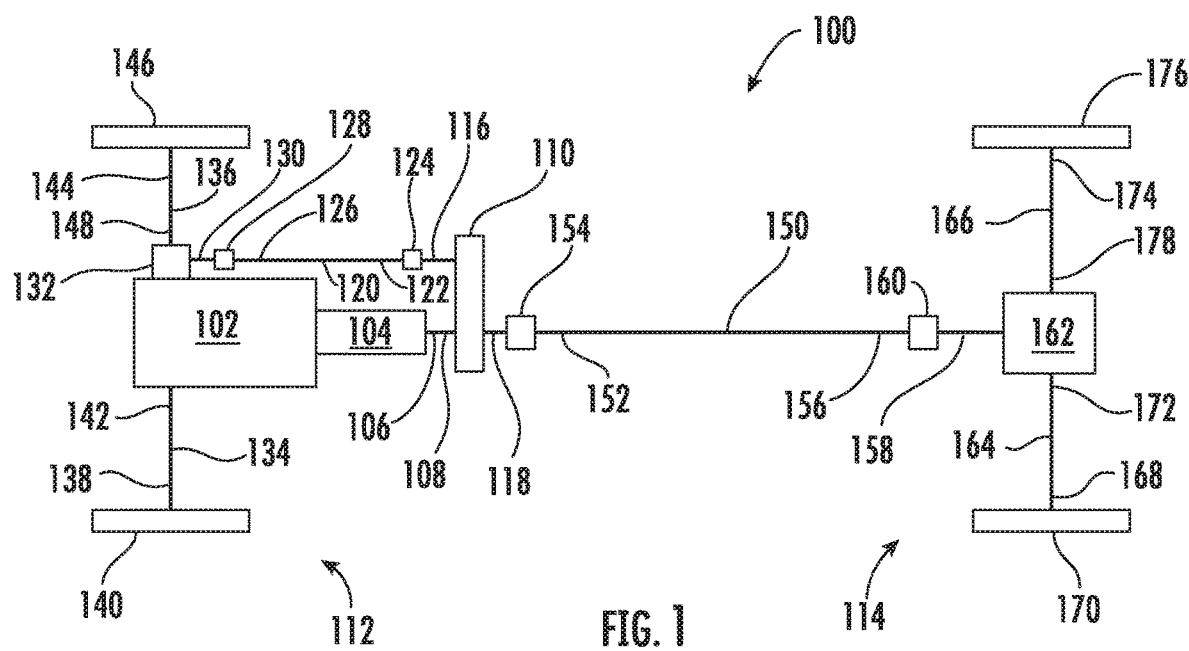
FIG. 1 is a schematic top-plan view of a vehicle having one or more lubrication fluid shrouds according to an embodiment of the disclosure.

FIG. 1 is a schematic top-plan view of a vehicle 100 having one or more lubrication fluid shrouds according to an embodiment of the disclosure. The vehicle 100 has an engine 102, which is drivingly connected to a transmission 104. A transmission output shaft 106 is then drivingly connected to an end of the transmission 104 opposite the engine 102. It is within the scope of this disclosure and as a non-limiting example that the engine 102 of the vehicle 100 may be an internal combustion engine, an electric motor, a steam turbine and/or a gas turbine. The transmission 104 is a power management system, which provides controlled application of the rotational energy generated by the engine 102 by means of a gearbox.

The transmission output shaft 106 is drivingly connected to a transfer case input shaft 108, which in turn is drivingly connected to a transfer case 110. The transfer case 110 is used in four-wheel drive and/or all-wheel-drive (AWD) vehicles to transfer the rotational power from the transmission 104 to a front axle system 112 and a rear axle system 114 by utilizing a series of gears and drive shafts. Additionally, the transfer case 110 allows the vehicle 100 to selectively operate in either a two-wheel drive mode of a four-wheel/AWD drive mode. As illustrated in FIG. 1 of the disclosure and as a non-limiting example, the transfer case 110 includes a first transfer case output shaft 116 and a second transfer case output shaft 118.

A first shaft 120 extends from the first transfer case output shaft 116 toward the front axle system 112 of the vehicle 100. The first shaft 120 transmits the rotational power from the transfer case 110 to the front axle system 112 of the vehicle 100 thereby drivingly connecting the transfer case 110 to the front axle system 112. It is within the scope of this disclosure and as a non-limiting example that the first shaft 120 may be a drive shaft, a prop shaft or a Cardan shaft.

As illustrated in FIG. 1 of the disclosure and as a non-limiting example, at least a portion of a first end portion 122 of the first shaft 120 is drivingly connected to an end of the first transfer case output shaft 116 opposite the transfer case 110 via a first joint assembly 124. Additionally, as illustrated in FIG. 1 of the disclosure and as a non-limiting example, at least a portion of a second end portion 126 of the first shaft 120 may be drivingly connected to an end of a second joint assembly 128. It is within the scope of this disclosure and as a non-limiting example that the first and/or second joint assembly 124 and/or 128 of the vehicle 100 may be a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

Drivingly connected to an end of the second joint assembly 128, opposite the first shaft 120, is a front axle input shaft 130. The front axle input shaft 130 of the vehicle 100 drivingly connects the first shaft 120 of the vehicle 100 to a front axle differential assembly 132 of the front axle system 112. In accordance with the embodiment to of the disclosure illustrated in FIG. 1 and as a non-limiting example, at least a portion of an end of the front axle system input shaft 130, opposite the first shaft 120, is drivingly connected to at least a portion of the front axle differential assembly 132. It is within the scope of this disclosure and as a non-limiting example that the front axle input shaft 130 may be a front differential input shaft, a coupling shaft, stub shaft or a front differential pinion shaft. The front axle differential assembly 132 is a set of gears that allows the outer drive wheel(s) of the vehicle 100 to rotate at a faster rate that the inner drive wheel(s). The rotational power is transmitted through the front axle system 112 as described in more detail below.

The front axle system 112 further includes a first front axle half shaft 134 and a second front axle half shaft 136. As illustrated in FIG. 1 of the disclosure and as a non-limiting example, the first front axle half shaft 134 extends substantially perpendicular to the front axle input shaft 130 of the vehicle 100. At least a portion of a first end portion 138 of the first front axle half shaft 134 is drivingly connected to a first front axle wheel assembly 140. As illustrated in FIG. 1 of the disclosure and as a non-limiting example, at least a portion of a second end portion 142 of the first front axle half shaft 134 is drivingly connected to an end of the front axle differential assembly 132. It is within the scope of this disclosure and as a non-limiting example that the second end portion 142 of the first front axle half shaft 134 may be drivingly connected to a front differential side gear, a separate stub shaft, a separate coupling shaft, a first front axle differential output shaft, a first front axle half shaft connect and disconnect assembly and/or a shaft that is formed as part of a front differential side gear.

Extending substantially perpendicular to the front axle system input shaft 130 is the second front axle half shaft 136. At least a portion of a first end portion 144 of the second front axle half shaft 136 is drivingly connected to a second front axle wheel assembly 146. As illustrated in FIG. 1 of the disclosure and as a non-limiting example, at least a portion of a second end portion 148 of the second front axle half shaft 136 is drivingly connected to an end of the front axle differential assembly 132 opposite the first front axle half shaft 134. It is within the scope of this disclosure and as a non-limiting example that the second end portion 148 of the second front axle half shaft 136 may be drivingly connected to a front differential side gear, a separate stub shaft, a separate coupling shaft, a second front axle differential output shaft, a second front axle half shaft connect and disconnect assembly and/or a shaft that is formed as part of a front differential side gear.

An end of the second transfer case output shaft 118 is drivingly connected to an end of the transfer case 110 opposite the transfer case input shaft 108 of the vehicle 100. A second shaft 150 extends from the second transfer case output shaft 118 toward the rear axle system 114 thereby drivingly connecting the transfer case 110 to the rear axle system 114 of the vehicle 100. As a non-limiting example, the second shaft 150 may be a drive shaft, a propeller shaft or a Cardan shaft. At least a portion of a first end portion 152 of the second shaft 150 is drivingly connected to an end of the second transfer case output shaft 118 opposite the transfer case 110 via a third joint assembly 154. It is within the scope of this disclosure and as a non-limiting example that the second shaft 150 may be a drive shaft, a propeller shaft or a Cardan shaft. Additionally, it is within the scope of this disclosure and as a non-limiting example that the seventh joint assembly 154 may be a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

As illustrated in FIG. 1 of the disclosure and as a non-limiting example, at least a portion of a second end portion 156 of the second haft 150 is drivingly connected to a rear axle system input shaft 158 via a fourth joint assembly 160. The rear axle system input shaft 158 drivingly connects the transfer case 100 to the rear axle system 114 of the vehicle 100. It is within the scope of this disclosure and as a non-limiting example that the rear axle system input shaft 158 may be a rear axle differential input shaft, a coupling shaft, stub shaft or a rear axle differential pinion shaft. Additionally, it is within the scope of this disclosure and as a non-limiting example that the fourth joint assembly 160 may be a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

Drivingly connected to an end of the rear axle system input shaft 158, opposite the second shaft 150, is a rear axle differential assembly 162 of the rear axle system 114. The rear axle differential assembly 162 is a set of gears that allows the outer drive wheel(s) of the vehicle 100 to rotate at a faster rate that the inner drive wheel(s). The rotational power is transmitted through the rear axle system 114 as described in more detail below.

As illustrated in FIG. 1 of the disclosure and as a non-limiting example, the rear axle system 114 further includes a first rear axle half shaft 164 and a second rear axle half shaft 166. The first rear axle half shaft 164 extends substantially perpendicular to the rear axle input shaft 158 of the vehicle 100. At least a portion of a first end portion 168 of the first rear axle half shaft 164 is drivingly connected to a first rear axle wheel assembly 170. As illustrated in FIG. 1 of the disclosure and as a non-limiting example, at least a portion of a second end portion 172 of the first rear axle half shaft 164 is drivingly connected to an end of the rear axle differential assembly 162. It is within the scope of this disclosure and as a non-limiting example that the second end portion 172 of the first rear axle half shaft 164 may be drivingly connected to a rear differential side gear, a separate stub shaft, a separate coupling shaft, a first rear axle differential output shaft a first rear axle half shaft connect and disconnect assembly and/or a shaft that is formed as part of a rear differential side gear.

Extending substantially perpendicular to the rear axle system input shaft 158 the second rear axle half shaft 166. At least a portion of a first end portion 174 of the second rear axle half shaft 166 is drivingly connected to a second rear axle wheel assembly 176 of the vehicle 100. As illustrated in FIG. 1 of the disclosure and as a non-limiting example, at least a portion of a second end portion 178 of the second rear axle half shaft 166 is drivingly connected to an end of the rear axle differential assembly 162 opposite the first rear axle half shaft 164. It is within the scope of this disclosure and as a non-limiting example that the second end portion 178 of the second rear axle half shaft 166 may be drivingly connected to a rear differential side gear, a separate stub shaft, a separate coupling shaft, a second rear axle differential output shaft, a second rear axle half shaft connect and disconnect assembly and/or a shaft that is formed as part of a rear differential side gear.

It is within the scope of this disclosure and as a non-limiting example that the transfer case 110, the front axle differential assembly 132 and/or the rear axle differential assembly 162 may include the use of a lubricant shroud according to an embodiment of the disclosure.

Figure 2:
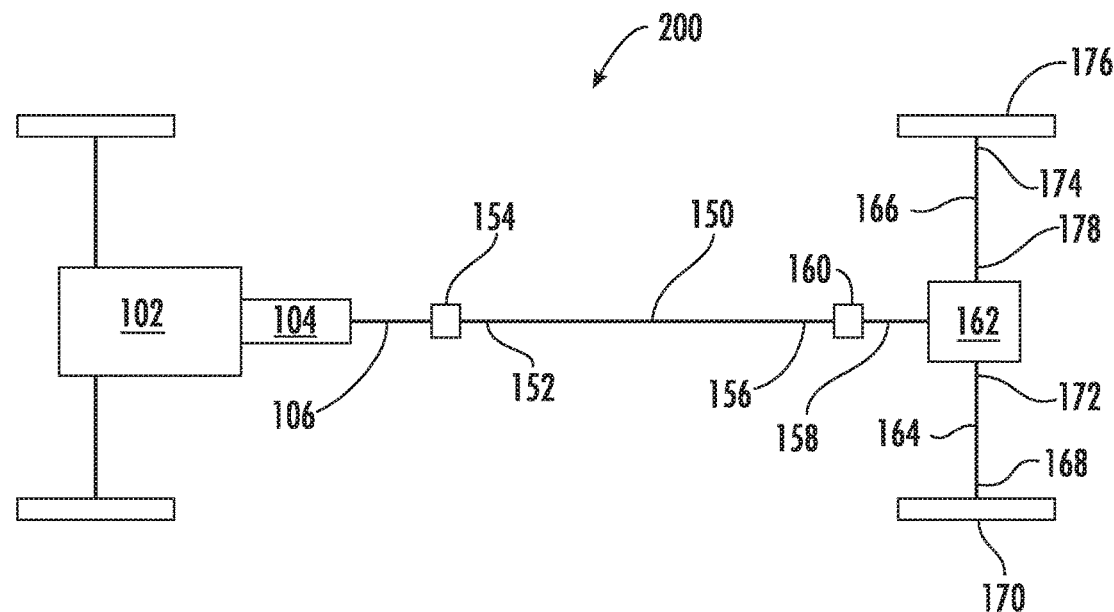
FIG. 2 is a schematic top-plan view of another vehicle having one or more lubrication fluid shrouds according to an embodiment of the disclosure.

FIG. 2 is a schematic top-plan view of another vehicle 200 having one or more quick connect assemblies according to an embodiment of the disclosure. The vehicle 300 illustrated in FIG. 2 is the same as the vehicle 100 illustrated in FIG. 1, except where specifically noted below. As illustrated in FIG. 2 of the disclosure and as a non-limiting example, the vehicle 200 does not include the use of the transfer case 110 that drivingly connects the transmission 104 to the front axle differential assembly 132 of the front axle system 112.

In accordance with the embodiment of the disclosure illustrated in FIG. 2 and as a non-limiting example, at least a portion of the end of the transmission output shaft 106, opposite the transmission 104, is drivingly connected to at least a portion of the end of the third joint assembly 154 opposite the second shaft 150 of the vehicle 200. As a result, in accordance with the embodiment of the disclosure illustrated in FIG. 2 and as a non-limiting example, the second shaft 150 of the vehicle 200 extends from the transmission output shaft 106 toward the rear axle system 114 of the vehicle 200.

It is within the scope of this disclosure and as a non-limiting example that the rear axle differential assembly 162 may include the use of a lubricant shroud according to an embodiment of the disclosure.

FIG. 3 is a schematic top-plan view yet another vehicle 300 having one or more lubrication fluid shrouds according to an embodiment of the disclosure. The vehicle 300 has an engine 302, which is drivingly connected to a transmission 304. As non-limiting example, the engine 302 of the vehicle 300 may be an internal combustion engine, an electric motor, a steam turbine and/or a gas turbine. A transmission output shaft 306 is then drivingly connected to an end of the transmission 304 opposite the engine 302 of the vehicle 300. As previously discussed in relation to FIG. 1 of the disclosure, the transmission 304 is a power management system, which provides controlled application of the rotational energy generated by the engine 302 by means of a gearbox.

Drivingly connected to an end of the transmission output shaft 306, opposite the transmission 304 is a transfer case input shaft 308. As illustrated in FIG. 3 of the disclosure and as a non-limiting example, drivingly connected to an end of the transfer case input shaft 308, opposite the transmission output shaft 306, is a transfer case 310 of the vehicle 300. The transfer case 310 of the vehicle 300 allows for the selective transfer the rotational power from the transmission 304 to a front axle system 312 and a tandem axle system 314 of the vehicle 300 by utilizing a series of gears and drive shafts. As illustrated in FIG. 3 of the disclosure and as a non-limiting example, the transfer case 310 includes a first transfer case output shaft 416 and a second transfer case output shaft 318.

A first shaft 320 extends from the first transfer case output shaft 316 toward the front axle system 312 of the vehicle 300. The first shaft 320 transmits the rotational power from the transfer case 310 to the front axle system 312 of the vehicle 300 thereby drivingly connecting the transfer case 310 to the front axle system 312. It is within the scope of this disclosure and as a non-limiting example that the first shaft 320 may be a drive shaft, a prop shaft, a Cardan shaft, an axle half shaft or a differential pinion shaft.

As illustrated in FIG. 3 of the disclosure and as a non-limiting example, at least a portion of a first end portion 322 of the first shaft 320 is drivingly connected to an end of the first transfer case output shaft 316 opposite the transfer case 310 via a first joint assembly 324. Additionally, as illustrated in FIG. 3 of the disclosure and as a non-limiting example, at least a portion of a second end portion 326 of the first shaft 320 may be drivingly connected to an end of a second joint assembly 328. It is within the scope of this disclosure and as a non-limiting example that the first and/or second joint assembly 324 and/or 328 of the vehicle 300 may be a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

Drivingly connected to an end of the second joint assembly 328, opposite the first shaft 320, is a front axle input shaft 330. The front axle input shaft 330 of the vehicle 300 drivingly connects the first shaft 320 of the vehicle 300 to a front axle differential assembly 332 of the front axle system 312. In accordance with the embodiment to of the disclosure illustrated in FIG. 3 and as a non-limiting example, at least a portion of an end of the front axle system input shaft 330, opposite the first shaft 320, is drivingly connected to at least a portion of the front axle differential assembly 332. It is within the scope of this disclosure and as a non-limiting example that the front axle input shaft 330 may be a front differential input shaft, a coupling shaft, stub shaft or a front differential pinion shaft. The front axle differential assembly 332 is a set of gears that allows the outer drive wheel(s) of the vehicle 400 to rotate at a faster rate that the inner drive wheel(s). The rotational power is transmitted through the front axle system 312 as described in more detail below.

The front axle system 312 further includes a first front axle half shaft 334 and a second front axle half shaft 336. As illustrated in FIG. 3 of the disclosure and as a non-limiting example, the first front axle half shaft 334 extends substantially perpendicular to the front axle input shaft 330 of the vehicle 300. At least a portion of a first end portion 338 of the first front axle half shaft 334 is drivingly connected to a first front axle wheel assembly 340. As illustrated in FIG. 3 of the disclosure and as a non-limiting example, at least a portion of a second end portion 342 of the first front axle half shaft 334 is drivingly connected to an end of the front axle differential assembly 332. It is within the scope of this disclosure and as a non-limiting example that the second end portion 342 of the first front axle half shaft 334 may be drivingly connected to a front differential side gear, a separate stub shaft, a separate coupling shaft, a first front axle differential output shaft, a first front axle half shaft connect and disconnect assembly and/or a shaft that is formed as part of a front differential side gear.

Extending substantially perpendicular to the front axle system input shaft 330 is the second front axle half shaft 336 of the vehicle 300. At least a portion of a first end portion 344 of the second front axle half shaft 336 is drivingly connected to a second front axle wheel assembly 346. As illustrated in FIG. 3 of the disclosure and as a non-limiting example, at least a portion of a second end portion 348 of the second front axle half shaft 336 is drivingly connected to an end of the front axle differential assembly 332 opposite the first front axle half shaft 334. It is within the scope of this disclosure and as a non-limiting example that the second end portion 348 of the second front axle half shaft 336 may be drivingly connected to a front differential side gear, a separate stub shaft, a separate coupling shaft, a second front axle differential output shaft, a second front axle half shaft connect and disconnect assembly and/or a shaft that is formed as part of a front differential side gear.

An end of the second transfer case output shaft 318 is drivingly connected to an end of the transfer case 310 opposite the transfer case input shaft 308 of the vehicle 300. A second shaft 350 extends from the second transfer case output shaft 318 toward a forward tandem axle system 352 of the tandem axle system 314 of the vehicle 300. As a non-limiting example, the second shaft 350 may be a drive shaft, a propeller shaft or a Cardan shaft.

At least a portion of a first end portion 354 of the second shaft 350 is drivingly connected to an end of the second transfer case output shaft 318 opposite the transfer case 310 via a third joint assembly 356. It is within the scope of this disclosure and as a non-limiting example that the third joint assembly 356 may be a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

As illustrated in FIG. 3 of the disclosure and as a non-limiting example, at least a portion of a second end portion 358 of the second shaft 350 may be drivingly connected to an end of an fourth joint assembly 360. It is within the scope of this disclosure and as a non-limiting example that the fourth joint assembly 360 may be a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

Drivingly connected to an end of the fourth joint assembly 360, opposite the second shaft 350, is drivingly connected to at least a portion of a forward tandem axle system input shaft 362. It is within the scope of this disclosure and as a non-limiting example that the forward tandem axle input shaft 362 may be a forward tandem axle differential input shaft, a coupling shaft, stub shaft, a forward tandem axle differential pinion shaft, an inter-axle differential input shaft or an inter-axle differential pinion shaft. Drivingly connected to an end of the forward tandem axle input shaft 362, opposite the second shaft 350, is an inter-axle differential assembly 364 of the forward tandem axle system 352 of the vehicle 300. The inter-axle differential assembly 364 is a device that divides the rotational power generated by the engine 302 between the axles in the vehicle 300. The rotational power is transmitted through the forward tandem axle system 352 as described in more detail below.

As illustrated in FIG. 3 of the disclosure and as a non-limiting example, the inter-axle differential assembly 364 of the vehicle 300 is drivingly connected to a forward tandem axle differential assembly 366 and a forward tandem axle system output shaft 368. The forward tandem axle differential assembly 366 is a set of gears that allows the outer drive wheel(s) of the vehicle 300 to rotate at a faster rate than the inner drive wheel(s).

The forward tandem axle system 352 of the vehicle 300 further includes a first forward tandem axle half shaft 370 and a second forward tandem axle half shaft 372. As illustrated in FIG. 3 of the disclosure and as a non-limiting example, the first forward tandem axle half shaft 370 extends substantially perpendicular to the forward tandem axle input shaft 362 of the vehicle 300. At least a portion of a first end portion 374 of the first forward tandem axle half shaft 370 is drivingly connected to at least a portion of a first forward tandem axle wheel assembly 376. As illustrated in FIG. 3 of the disclosure and as a non-limiting example, at least a portion of a second end portion 378 of the first forward tandem axle half shaft 370 is drivingly connected to an end of the forward tandem axle differential assembly 366. It is within the scope of this disclosure and as a non-limiting example that the second end portion 378 of the first forward tandem axle half shaft 370 may be drivingly connected to a forward tandem axle differential side gear, a separate stub shaft, a separate coupling shaft, a first forward tandem axle differential output shaft, a first forward tandem axle half shaft connect and disconnect assembly and/or a shaft that is formed as part of a forward tandem axle differential side gear.

Extending substantially perpendicular to the forward tandem axle system input shaft 362 is the second forward tandem axle system input shaft 372. At least a portion of a first end portion 380 of the second forward tandem axle half shaft 372 is drivingly connected to at least a portion of a second forward tandem axle wheel assembly 382 of the vehicle 300. As illustrated in FIG. 3 of the disclosure and as a non-limiting example, at least a portion of a second end portion 384 of the second forward tandem axle half shaft 372 is drivingly connected to an end of the forward tandem axle differential assembly 366 opposite the first forward tandem axle half shaft 370. It is within the scope of this disclosure and as a non-limiting example that the second end portion 384 of the second forward tandem axle half shaft 372 may be drivingly connected to a forward tandem axle differential side gear, a separate stub shaft, a separate coupling shaft, a second forward tandem axle differential output shaft, a second forward tandem axle half shaft connect and disconnect assembly and/or a shaft that is formed as part of a forward tandem axle differential side gear.

On end of the forward tandem axle system output shaft 368 is drivingly connected to a side of the inter-axle differential assembly 364 opposite the forward tandem axle input shaft 362. An end of the forward tandem axle system output shaft 368, opposite the inter-axle differential assembly 364, is drivingly connected to a first end portion 386 of a third shaft 388 via a fifth coupling assembly 390. The third shaft 388 extends from the forward tandem axle system output shaft 368 toward a rear tandem axle system 392 of the tandem axle system 314 of the vehicle 300. It is within the scope of this disclosure and as a non-limiting example, that the third shaft 388 may be a drive shaft, a propeller shaft or a Cardan shaft. Additionally, it is within the scope of this disclosure and as a non-limiting example that the fifth joint assembly 390 may be a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

At least a portion of a second end portion 392 of the third shaft 388 is drivingly connected to at least a portion of a sixth coupling assembly 394. It is within the scope of this disclosure and as a non-limiting example that the sixth joint assembly 394 may be a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

Drivingly connected to an end of the sixth coupling assembly 394, opposite the third shaft 388, is an end of a rear tandem axle system input shaft 396. The rear tandem axle system input shaft 396 drivingly connects the inter-axle differential assembly 364 to a rear tandem axle differential assembly 398 of the rear tandem axle system 392 of the vehicle 300. As a non-limiting example, the rear tandem axle system input shaft 396 may be a rear tandem axle differential input shaft, a coupling shaft, stub shaft or a rear tandem axle differential pinion shaft. At least a portion of an end of the rear tandem axle system input shaft 396, opposite the third shaft 388, is drivingly connected to at least a portion of the rear tandem axle differential assembly 398. The rear tandem axle differential assembly 398 is a set of gears that allows the outer drive wheel(s) of the vehicle 300 to rotate at a faster rate that the inner drive wheel(s). The rotational power is transmitted through the rear tandem axle system 392 as described in more detail below.

The rear tandem axle system 392 of the vehicle 300 further includes a first rear tandem axle half shaft 400 and a second rear tandem axle half shaft 402. As illustrated in FIG. 3 of the disclosure and as a non-limiting example, the first rear tandem axle half shaft 400 extends substantially perpendicular to the rear tandem axle input shaft 396 of the vehicle 300. At least a portion of a first end portion 404 of the first rear tandem axle half shaft 400 is drivingly connected to at least a portion of a first rear tandem axle wheel assembly 406. As illustrated in FIG. 3 of the disclosure and as a non-limiting example, at least a portion of a second end portion 408 of the first rear tandem axle half shaft 400 is drivingly connected to an end of the rear tandem axle differential assembly 398. It is within the scope of this disclosure and as a non-limiting example that the second end portion 408 of the first rear tandem axle half shaft 400 may be drivingly connected to a rear tandem axle differential side gear, a separate stub shaft, a separate coupling shaft, a first rear tandem axle differential output shaft, a first rear tandem axle half shaft connect and disconnect assembly and/or a shaft that is formed as part of a rear tandem axle differential side gear.

Extending substantially perpendicular to the rear tandem axle system input shaft 396 is the second rear tandem axle system input shaft 402 of the vehicle 300. At least a portion of a first end portion 410 of the second rear tandem axle half shaft 402 is drivingly connected to at least a portion of a second rear tandem axle wheel assembly 412. As illustrated in FIG. 3 of the disclosure and as a non-limiting example, at least a portion of a second end portion 414 of the second rear tandem axle half shaft 402 is drivingly connected to an end of the rear tandem axle differential assembly 398 opposite the first rear tandem axle half shaft 400. It is within the scope of this disclosure and as a non-limiting example that the second end portion 414 of the second rear tandem axle half shaft 402 may be drivingly connected to a rear tandem axle differential side gear, a separate stub shaft, a separate coupling shaft, a second rear tandem axle differential output shaft, a second rear tandem axle half shaft connect and disconnect assembly and/or a shaft that is formed as part of a rear tandem axle differential side gear.

It is within the scope of this disclosure and as a non-limiting example that the transfer case 310, the front axle differential assembly 332, the inter-axle differential assembly 364, the forward tandem axle differential assembly 366 and/or the rear tandem axle differential assembly 398 may include the use of a lubricant shroud according to an embodiment of the disclosure.

FIG. 4 is a schematic top-plan view of still yet another vehicle 500 having one or more lubrication fluid shrouds according to an embodiment of the disclosure. The vehicle 500 illustrated in FIG. 4 is the same as the vehicle 300 illustrated in FIG. 3, except where specifically noted below. As illustrated in FIG. 4 of the disclosure and as a non-limiting example, the vehicle 500 does not include the use of the transfer case 310 that drivingly connects the transmission 304 to the front axle differential assembly 332 of the front axle system 312.

In accordance with the embodiment of the disclosure illustrated in FIG. 4 and as a non-limiting example, at least a portion of the end of the transmission output shaft 306, opposite the transmission 304, is drivingly connected to at least a portion of an end of the third joint assembly 356 opposite the second shaft 350 of the vehicle 500. As a result, in accordance with the embodiment of the disclosure illustrated in FIG. 4 and as a non-limiting example, the second shaft 350 extends from the transmission output shaft 306 toward the forward tandem axle system 352 of a tandem axle system 314 of the vehicle 500.

It is within the scope of this disclosure and as a non-limiting example that the inter-axle differential assembly 364, the forward tandem axle differential assembly 366 and/or the rear tandem axle differential assembly 398 may include the use of a lubricant shroud according to an embodiment of the disclosure.

Figure 5:
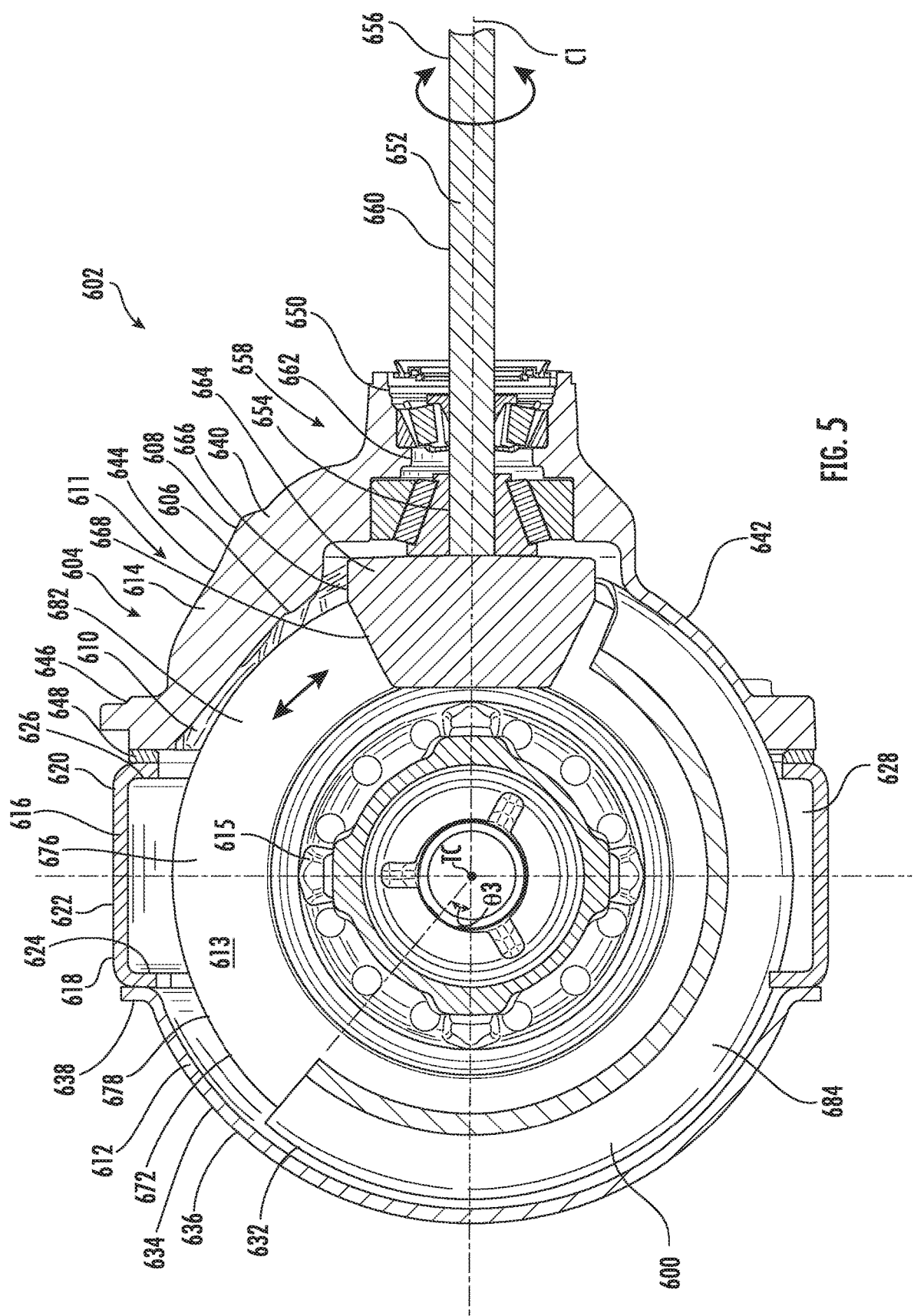
FIG. 5 is a partial cut-away schematic side-view of a drive unit assembly having a lubrication fluid shroud according to an embodiment of the disclosure.
Figure 6:
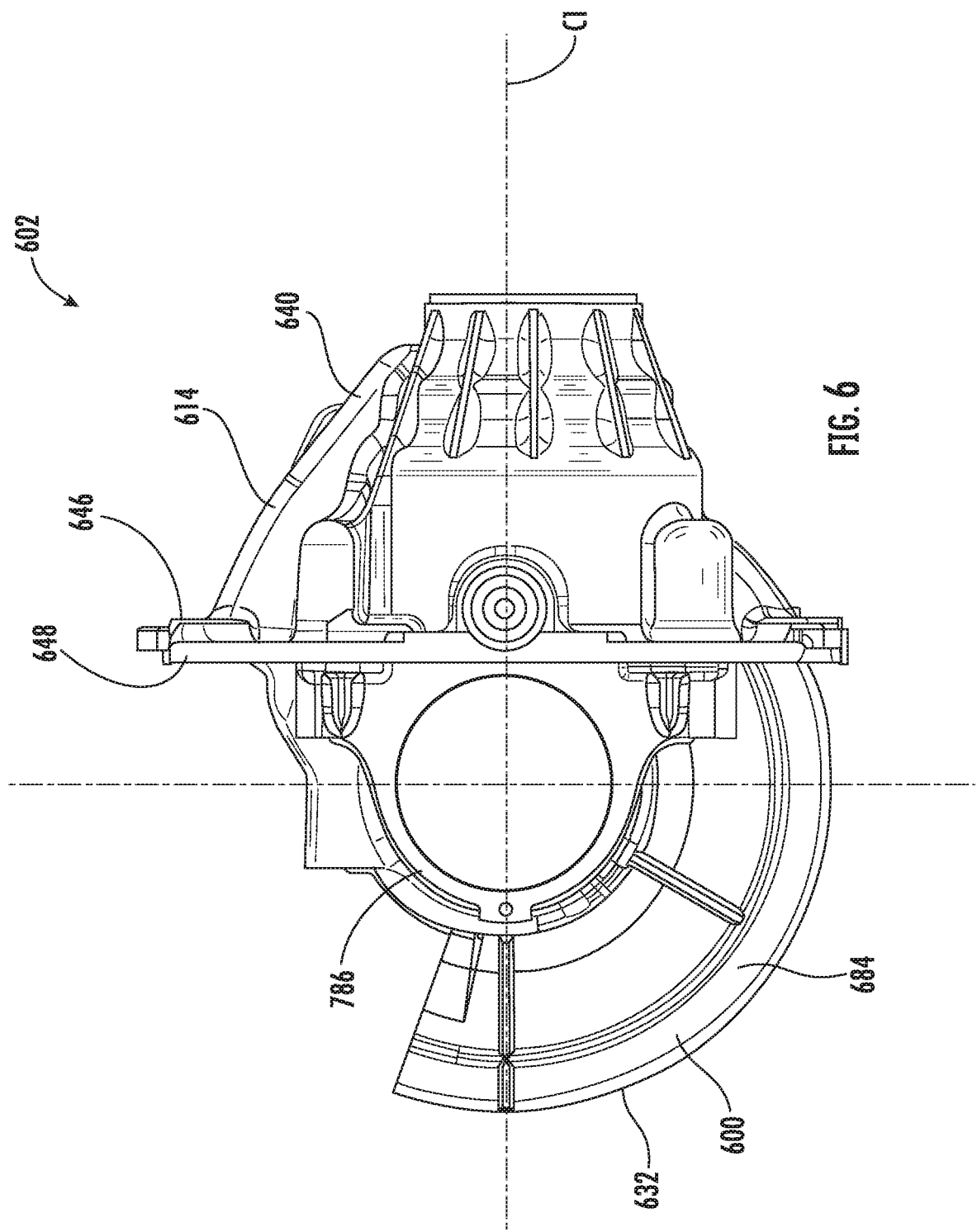
FIG. 6 is a schematic side-view of the drive unit assembly illustrated in FIG. 5 having the lubrication fluid shroud according to the embodiment illustrated in FIG. 5 of the disclosure.
Figure 7:
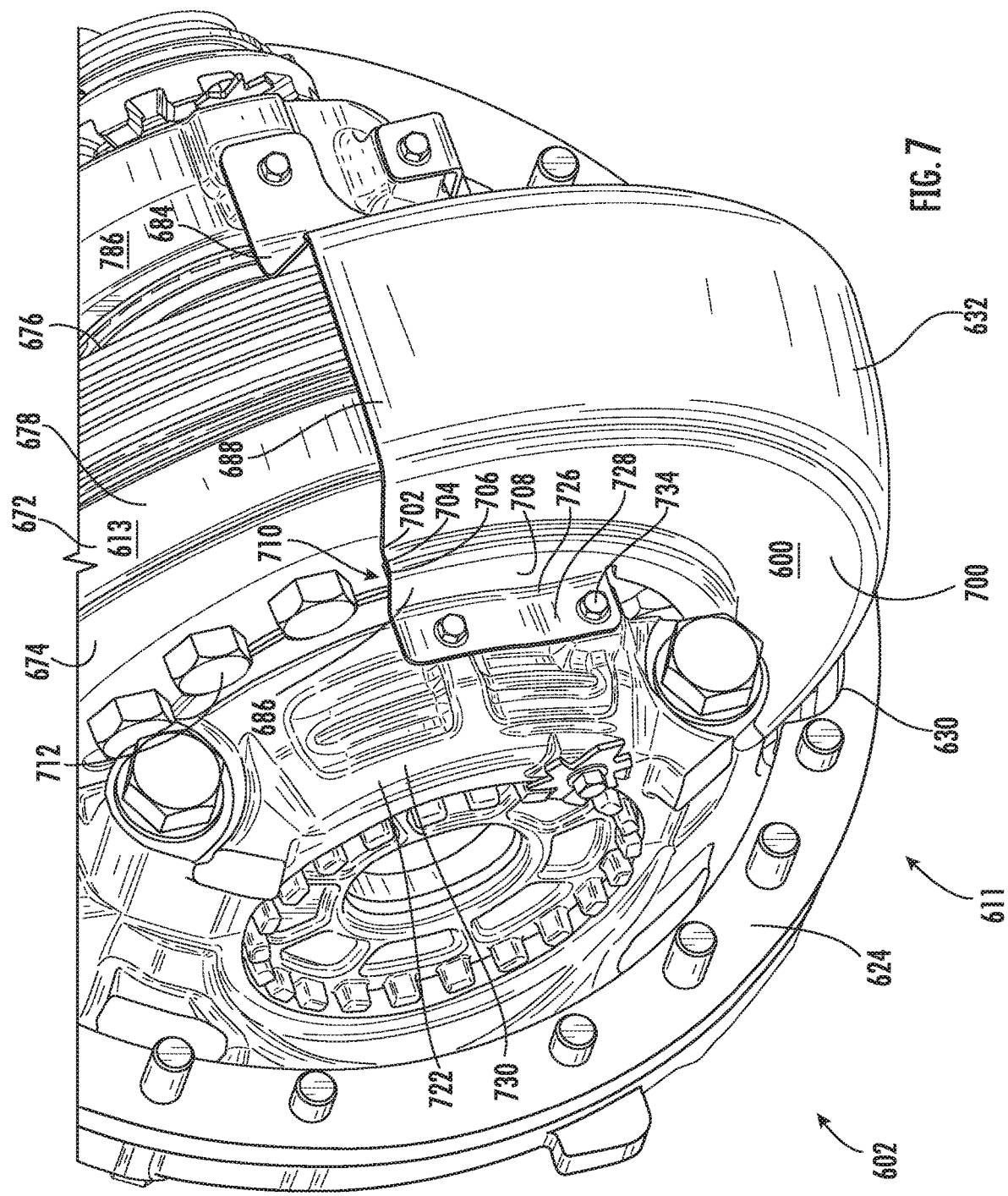
FIG. 7 is a schematic perspective view of the drive unit assembly illustrated in FIGS. 5 and 6 having the lubrication fluid shroud according to the embodiment illustrated in FIGS. 5 and 6 of the disclosure.
Figure 8:
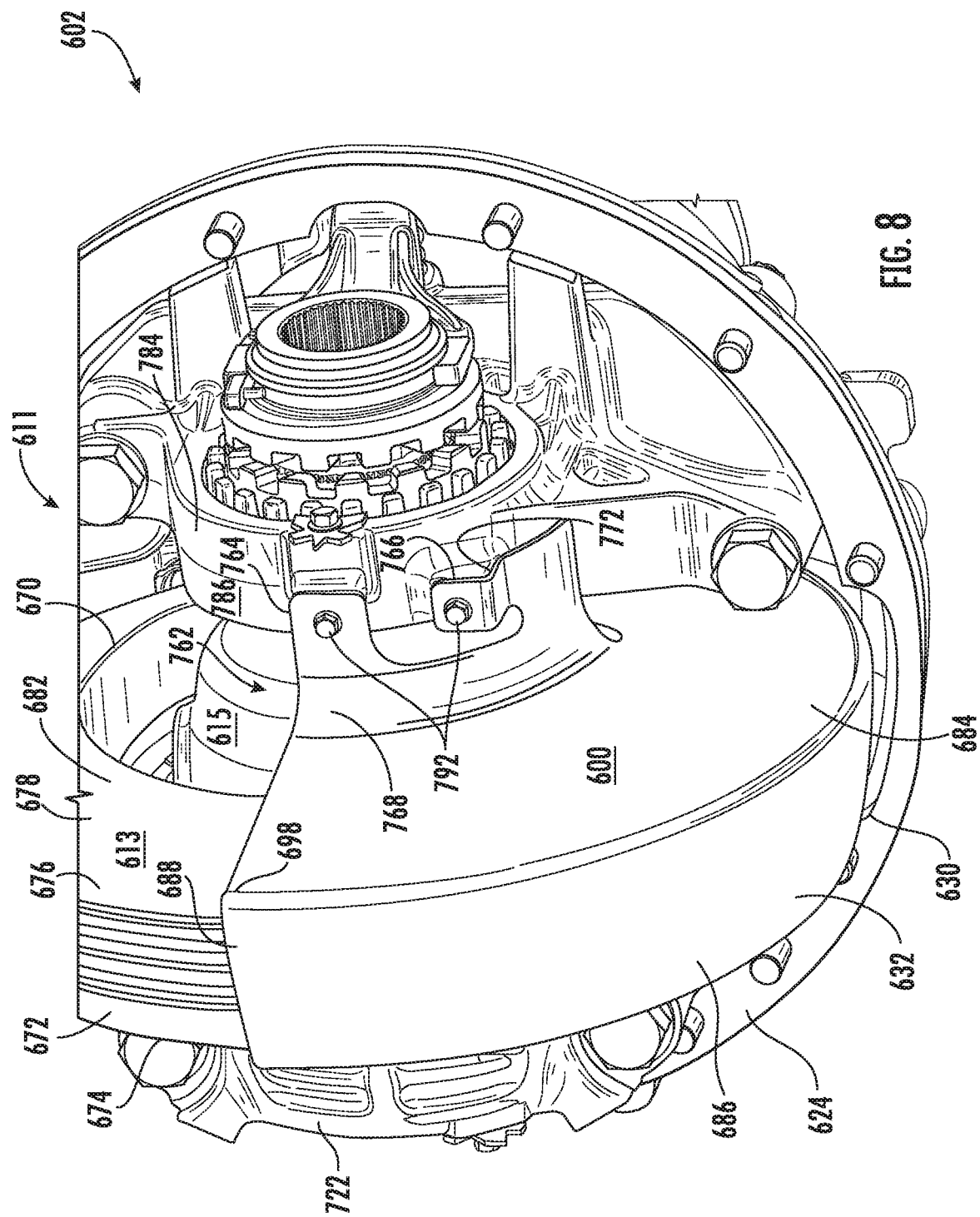
FIG. 8 is a schematic perspective view of the drive unit assembly illustrated in FIGS. 5-7 having the lubrication fluid shroud according to the embodiment illustrated in FIGS. 5-7 of the disclosure.
Figure 9:
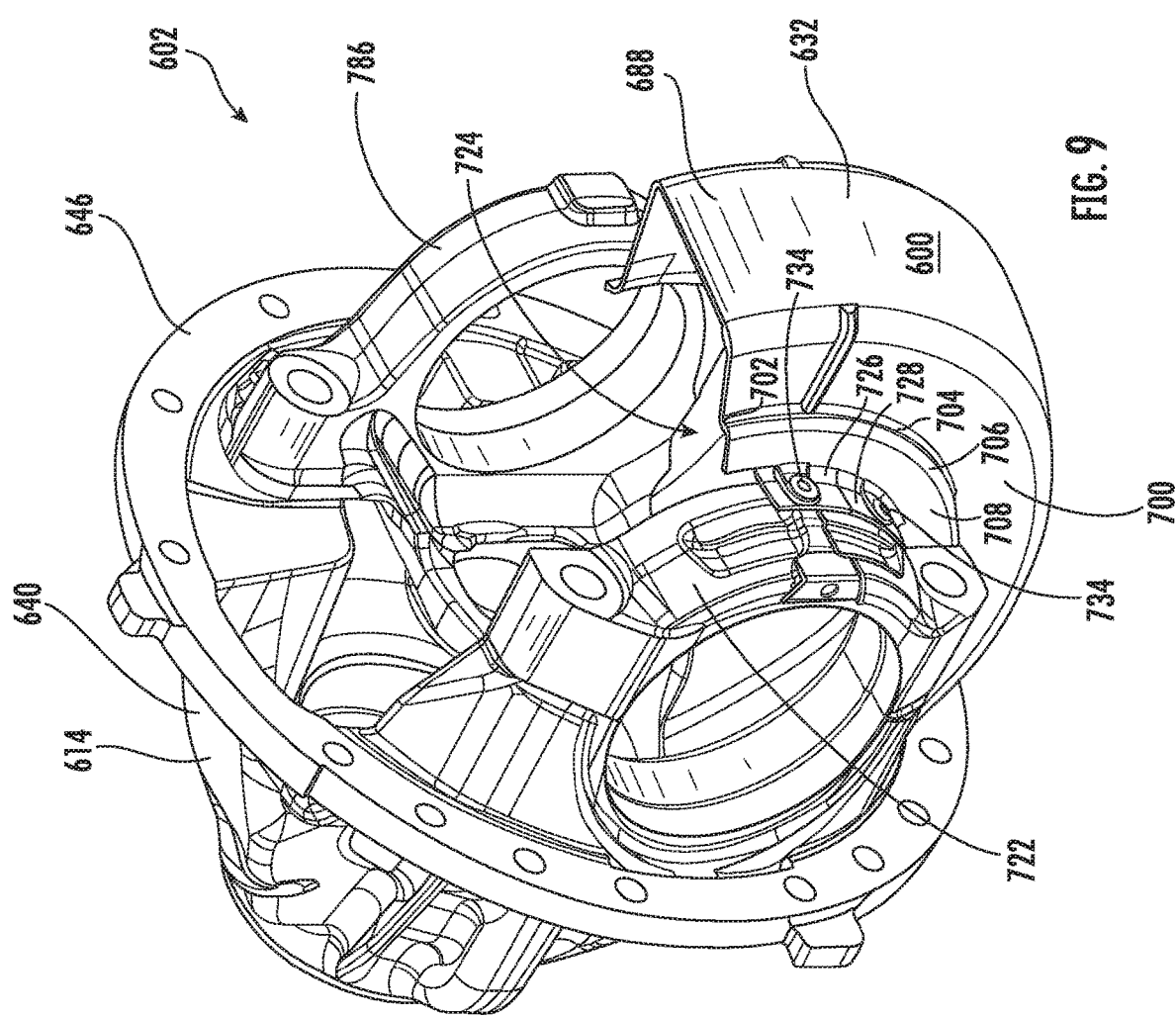
FIG. 9 is a schematic perspective view of the drive unit assembly illustrated in FIGS. 5-8 having the lubrication fluid shroud according to the embodiment illustrated in FIGS. 5-8 of the disclosure.

FIGS. 5-11 provide a schematic illustration of a lubrication fluid shroud assembly 600 (hereinafter referred to as a "shroud") according to an embodiment of the disclosure. As best seen in FIG. 5 of the disclosure and as a non-limiting example, the shroud may be used in combination with a drive unit assembly 602. In accordance with the embodiment of the disclosure illustrated in FIG. 5 and as a non-limiting example, the drive unit assembly 602 may include a housing 604 having an inner surface 606 and an outer surface 608 defining a hollow portion 610 therein. It is within the scope of this disclosure and as a non-limiting example that the hollow portion 610 of the housing 604 may be of a size and shape to receive and/or retain at least a portion of a gear set 611. As best seen in FIGS. 5, 7 and 8 of the disclosure and as a non-limiting example, the gear set 611 of the drive unit assembly 602 may include a ring gear 613 that is drivingly connected to at least a portion of a differential case 615 housing at least a portion of a differential gear set (not shown). It is within the scope of this disclosure and as a non-limiting example that the housing may be a single unitary piece or made of a plurality of pieces that are attached to each other by any conventional attachment method.

As best seen in FIG. 5 of the disclosure and as a non-limiting example, at the housing 604 includes a first housing part 612, a third housing part 614 and a second housing part 616 interposed between the first and second housing parts 612 and 614 of the housing 604. In accordance with the embodiment of the disclosure illustrated in FIG. 5 and as a non-limiting example, the second housing part 616 has a first end portion 618, a second end portion 620 and an intermediate portion 622 interposed between the first and second end portions 618 and 620 of the housing 604. Circumferentially extending inboard from at least a portion of the first end portion 618 of the second housing part 616 of the housing 604 is a first reduced diameter portion 624. As best seen in FIG. 5 of the disclosure and as a non-limiting example, the first reduced diameter portion 624 of the second housing part 616 extends inboard into the hollow portion 610 of the housing 604.

Additionally, circumferentially extending inboard from at least a portion of the second end portion 620 of the second housing part 616 of the housing 604 is a second reduced diameter portion 626. As best seen in FIG. 5 of the disclosure and as a non-limiting example, the second reduced diameter portion 626 of the second housing part 616 of the housing 604 extends inboard into the hollow portion 610 of the housing 604. It is therefore within the scope of this disclosure and as a non-limiting example that the second housing part 616 of the housing 604 may have a substantially U-shaped cross-sectional shape.

The intermediate portion 633 of the second part forms at least a portion of a primary sump 628 for an amount of lubrication fluid (not shown) disposed within the hollow portion 610 of the housing 604 of the drive unit assembly 602. It is to be understood that the lubrication fluid (not shown) within the housing 604 may be used in order to increase the overall life and durability of the drive unit assembly 602. The primary sump 628 provides a primary reservoir for the collection and retention of the lubrication fluid (not shown) within the housing 604 when the drive unit assembly is in a non-operational (or resting) state and/or engaged in an operational (or non-resting) state. It is within the scope of this disclosure and as a non-limiting example, that the substantially U-shaped cross-sectional shape of the second housing part 616 of the housing 604 may aid in facilitating the collection and/or retention of at least a portion of the wear particles (not shown) that are generated by the components of the drive unit assembly 602 when in operation. Because the wear particles (not shown) generated by the drive unit assembly 602 are non-buoyant within the lubrication fluid (not shown), they are eventually collected and/or retained within the intermediate portion 622 of the second housing part 616 of the housing 604 of the drive unit assembly 602. This prevents the wear particles (not shown) from coming into direct contact with the meshing components of the drive unit assembly 602 which tends to accelerate the wear of the various components of the drive unit assembly 602. As a result, it is to be understood that the second housing part 616 of the housing 604 further aids in improving the overall life and durability of the drive unit assembly 602.

As best seen in FIGS. 7 and 8 of the disclosure and as a non-limiting example, at least a portion of the first decreased diameter portion 624 of the second housing part 616 of the housing 604 of the drive unit assembly 602 may include a first shroud receiving portion 630. The first shroud receiving portion 630 of the first reduced diameter portion 624 of the second housing part 616 of the housing 604 has a size and shape to receive and/or retain at least a portion of the shroud 600 of the drive unit assembly 602. As a result, it is within the scope of this disclosure and as a non-limiting example that the first shroud receiving portion 630 in the first reduced diameter portion 624 of the second housing part 616 of the housing 604 may have a shape that is complementary to an outermost periphery 632 of the shroud 600. Additionally, it is within the scope of this disclosure and as a non-limiting example that the first shroud receiving portion 630 of the second housing part 616 of the housing 604 may be substantially U-shaped.

In accordance with an embodiment of the disclosure (not shown) and as a non-limiting example, at least a portion of the second decreased diameter portion 626 of the second housing part 616 of the housing 604 of the drive unit assembly 602 may include a second shroud receiving portion (not shown). The second shroud receiving portion (not shown) of the second reduced diameter portion 626 of the second housing part 616 of the housing 604 has a size and shape to receive and/or retain at least a portion of the shroud 600 of the drive unit assembly 602. As a result, it is within the scope of this disclosure and as a non-limiting example that the second shroud receiving portion (not shown) in the second reduced diameter portion 626 of the second housing part 616 of the housing 604 may have a shape that is complementary to the outermost periphery 632 of the shroud 600. Additionally, it is within the scope of this disclosure and as a non-limiting example that the second shroud receiving portion (not shown) of the second housing part 616 of the housing 604 may be substantially U-shaped.

Disposed outboard from and connected to at least a portion of the first reduced diameter portion 624 of the second housing part 616 of the housing 604 is the first housing part 612 of the housing 604 of the drive unit assembly 602. As best seen in FIG. 5 of the disclosure and as a non-limiting example, the first housing part 612 of the housing 604 may have a body portion 634 with a shroud 600 receiving portion 636. The shroud receiving portion 636 of the first housing part 612 of the housing 604 may have a size and shape to receive and/or retain at least a portion of the shroud 600 when the drive unit assembly 602 is assembled. Additionally, the shroud receiving portion 636 of the first housing part 612 may have a size and shape to receive and/or retain at least a portion of the ring gear 613 of the gear set 611. It is therefore to be understood that the shroud receiving portion 636 of the body portion 634 of the first housing part 612 of the housing 604 may have a shape that is complementary to that of the shroud 600 of the drive unit assembly 602.

Circumferentially extending outboard from at least a portion of the body portion 634 of the first housing part 634 of the housing 604 is a first housing part flange portion 638. At least a portion of the first housing part flange portion 638 of the first housing part 612 is disposed directly adjacent to and axially outboard from at least a portion of the first reduced diameter portion 624 of the second housing part 616 of the housing 604. The first housing part flange portion 638 of the first housing part 612 provides an attachment surface to attach at least a portion of the first housing part 612 to at least a portion of the second housing part 616. It is within the scope of this disclosure and as a non-limiting example that the first housing part flange portion 638 of the first housing part 612 may be connected to at least a portion of the first reduced diameter portion 624 of the second housing part 616 by using one or more welds, one or more mechanical fasteners, one or more adhesives or a threaded connection. As a non-limiting example, at least a portion of the first housing part flange portion 638 of the first housing part 612 may have a shape that is complementary to the first reduced diameter portion 624 of the second housing part 616.

Disposed outboard at least a portion of the second housing part 616, opposite the first housing part 612 is the third housing part 614 of the housing 604. As best seen in FIG. 5 of the disclosure and as a non-limiting example, the third housing part 614 has a body portion 640. In accordance with an embodiment of the disclosure and as a non-limiting example, at least a portion of a bottom portion 642 of the body portion 640 of the third housing part 614 has a size and shape to receive and/or retain at least a portion of the shroud 600 of the drive unit assembly 600. Additionally, in accordance with an embodiment of the disclosure and as a non-limiting example, at least a portion of a top portion 644 of the body portion 640 of the third housing part 614 has a size and shape to receive at least a portion of the ring gear 613, the differential case 615 and/or the differential gear set (not shown).

Circumferentially extending outboard from at least a portion of the body portion 640 of the third housing part 614 is a third housing part flange portion 646. At least a portion of the third housing portion flange portion 646 may be disposed axially outboard from at least a portion of the second reduced diameter portion 626 of the second housing part 616 of the housing 604. The third housing part flange portion 646 of the third housing part 614 provides an attachment surface to attach at least a portion of the third housing part 614 to at least a portion of the second housing part 616. It is within the scope of this disclosure and as a non-limiting example that the third housing part flange portion 646 of the third housing part 614 may be connected to at least a portion of the second reduced diameter portion 626 of the second housing part 616 by using one or more welds, one or more mechanical fasteners, one or more adhesives or a threaded connection. As a non-limiting example, at least a portion of the second housing part flange portion 646 of the third housing part 614 may have a shape that is complementary to the second reduced diameter portion 626 of the second housing part 616.

At least a portion of a sealing member 648 may be interposed between at least a portion of the second reduced diameter portion 626 of the second housing part 616 and at least a portion of the third housing part flange portion 646 of the third housing portion 614 of the drive unit assembly 602. When assembled, at least a portion of the sealing member 648 sealingly engages at least at least a portion of the second reduced diameter portion 626 of the second housing member 616 and the third housing portion flange portion 646 of the third housing portion 614. It is to be understood that the sealing member 648 of the drive unit assembly 602 aids in preventing the migration of an amount of lubrication fluid out of the housing 604. As a non-limiting example, the sealing member 648 may be an O-ring or a gasket.

Extending from the outer surface 608 to the inner surface 606 of the third housing part 614 of the drive unit assembly 602 is a third housing part aperture 650. The third housing part aperture 650 may have a size and shape to receive and/or retain at least a portion of a shaft 652 having a first end portion 654 and a second end portion 656. As best seen in FIG. 5 of the disclosure and as a non-limiting example, at least a portion of the shaft 652 extends from outside the housing 604 into the hollow portion 610 of the housing 604. At least a portion of the second end portion 656 of the shaft 652 may be either directly or indirectly connected to a source of rotational power. It is within the scope of this disclosure and as a non-limiting example that the shaft 652 may be a differential input shaft, a pinion shaft, an inter-axle differential pinion shaft, a front axle system input shaft, a rear axle system input shaft, a forward tandem axle system input shaft or a rear tandem axle system input shaft.

At least a portion of the shaft 652 may be rotationally supported within the third housing part aperture 650. As best seen in FIG. 5 of the disclosure and as a non-limiting example, at least a portion of the shaft 652 is rotationally supported within the third housing part aperture 650 by a shaft bearing assembly 658 having one or more bearings. It is within the scope of this disclosure and as a non-limiting example that the shaft bearing assembly 658 of the drive unit assembly 602 may include the use of one or more tapered roller bearing assemblies that are interposed between an outer surface 660 of the shaft 652 and the surface 662 defining the third housing part aperture 650.

Integrally connected to at least a portion of the first end portion 654 of the shaft 652, at a point within the hollow portion 610 of the housing 604, is a pinion gear 664. The pinion gear 664 of the shaft 652 drivingly connects the source of rotational power (not shown) to the ring gear 613 of the drive unit assembly 602. It is therefore to be understood that at least a portion of the pinion gear 664 may be drivingly connected to at least a portion of the ring gear 613.

Circumferentially extending from at least a portion of an outer surface 666 of the pinion gear is a plurality of pinion gear teeth 668. It is within the scope of this disclosure and as a non-limiting example that the pinion gear may be integrally formed as part of the first end portion 654 of the shaft 652 of the drive unit assembly 602. Additionally, it is within the scope of this disclosure and as a non-limiting example that the pinion gear may be integrally connected to at least a portion of the first end portion 654 of the shaft 652 by using one or more welds, one or more mechanical fasteners, one or more adhesives, a spline connection, an interference fit and/or a threaded connection.

As illustrated in FIGS. 5, 7 and 8 of the disclosure and as a non-limiting example, the ring gear 613 of the drive unit assembly 602 has an innermost surface 670, an outermost surface 672, a first side 674 and a second side 676. Circumferentially extending from at least a portion of an outer surface 678 of the second side 676 of the ring gear 613 is a plurality of ring gear teeth 682. The plurality of ring gear teeth 682 of the ring gear 613 are complementary to and meshingly engaged with the plurality of pinion gear teeth 668 on the outer surface 666 of the pinion gear 664. In accordance with the embodiment of the disclosure illustrated in FIGS. 5, 7 and 8 and as a non-limiting example, at least a portion of the ring gear 613 may be disposed within the shroud 600 of the drive unit assembly 602.

As best seen in FIGS. 7, 8, 10 and 11 and as a non-limiting example, the shroud 600 may include a first shroud member 684 and a second shroud member 686. It is within the scope of this disclosure and as a non-limiting example that the first and second shroud members 684 and 686 may be made of steel, an aluminium alloy, a plastic composition, a polymeric composition, an elastomeric composition, a carbon fibre composition, a fiberglass composition, a ceramic composition, a nylon composition and/or an ABS composition. It is to be understood that the first and second shroud members 684 and 686 may be made of the similar materials or dis-similar materials.

Figure 10:
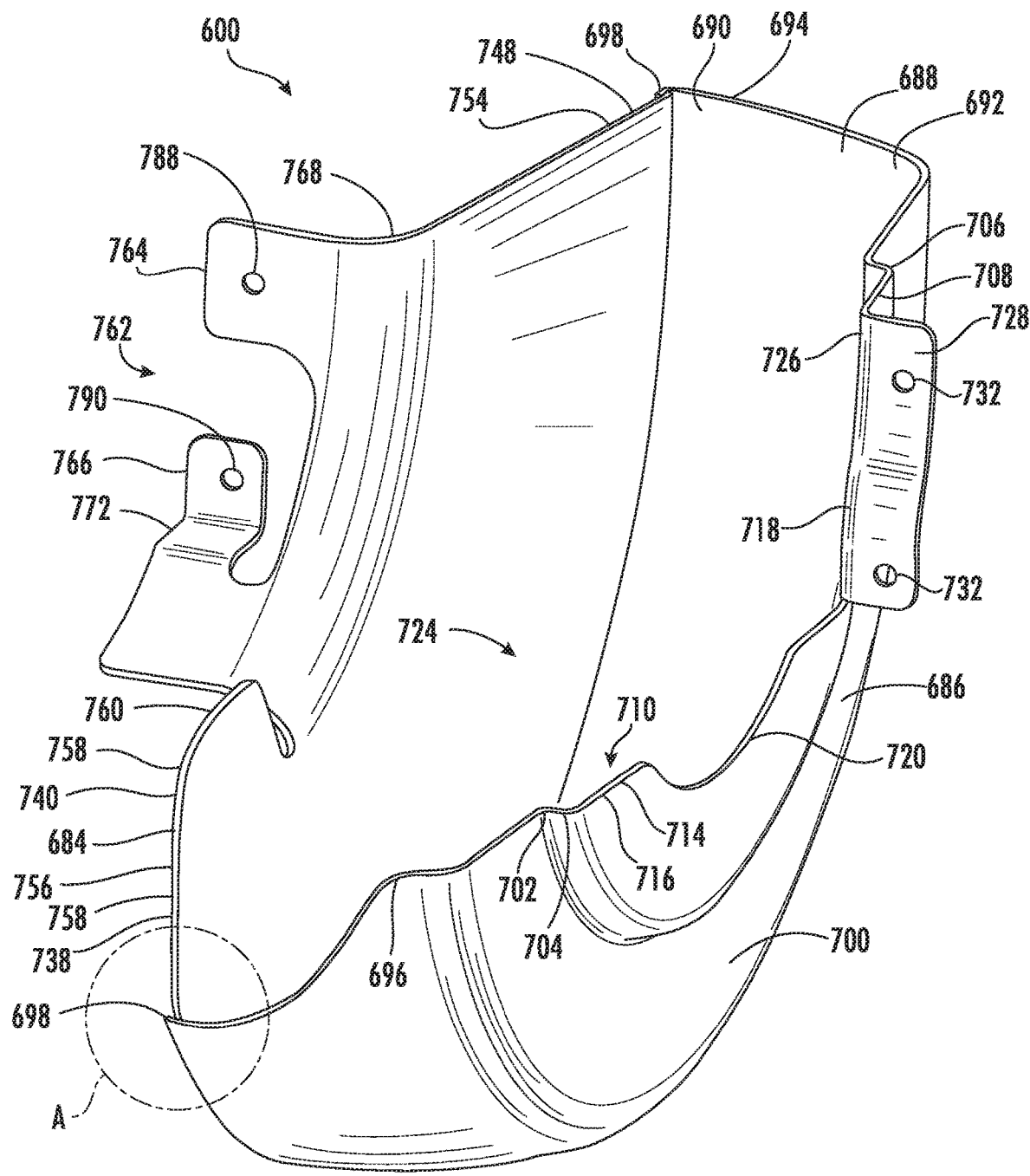
FIG. 10 is a schematic perspective view of the lubrication fluid shroud according to the embodiment illustrated in FIGS. 5-9 of the disclosure.
Figure 10A:
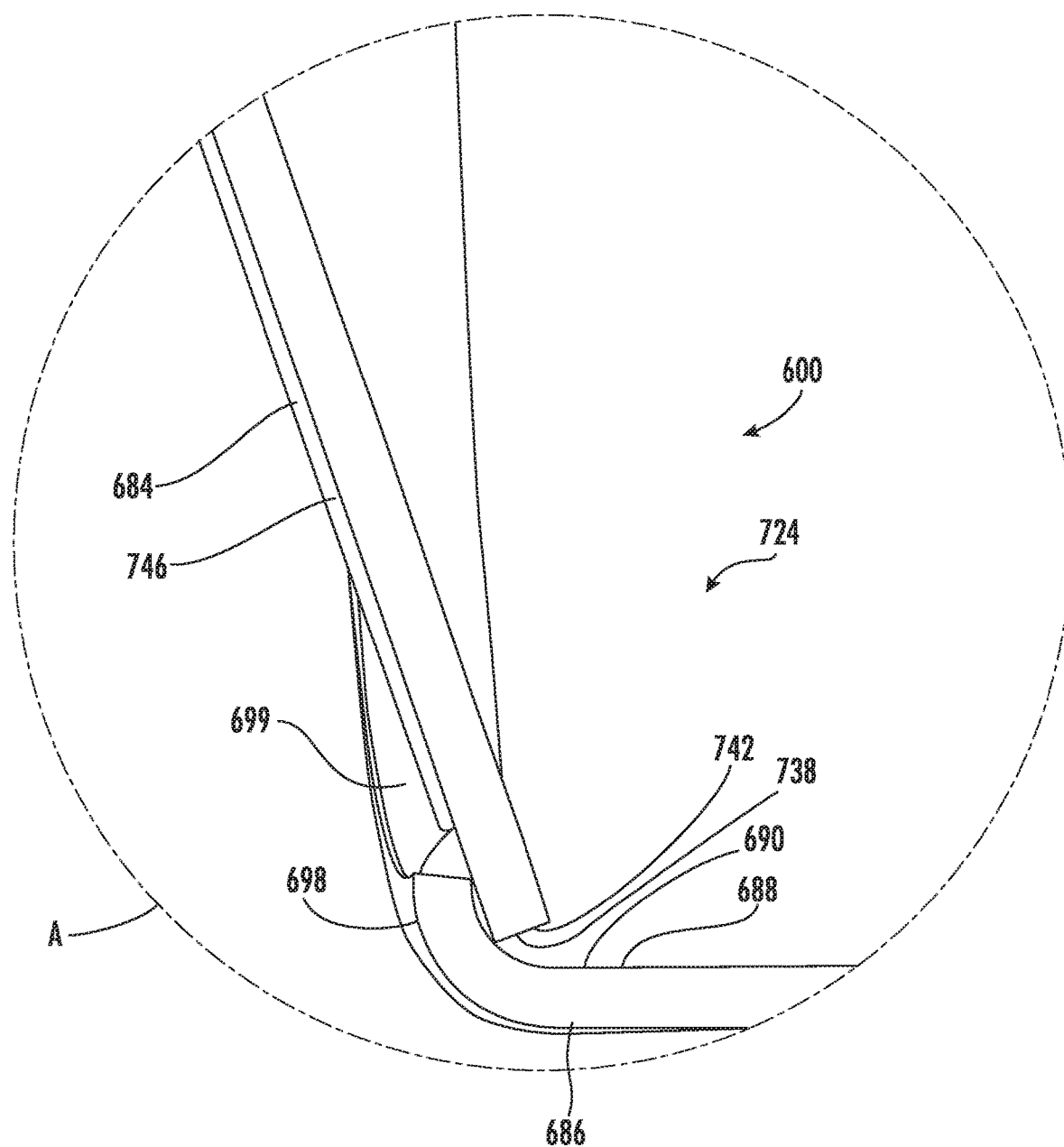
FIG. 10A is a schematic detailed view of a portion of the lubrication fluid shroud illustrated in FIG. 10 of the disclosure.
Figure 11:
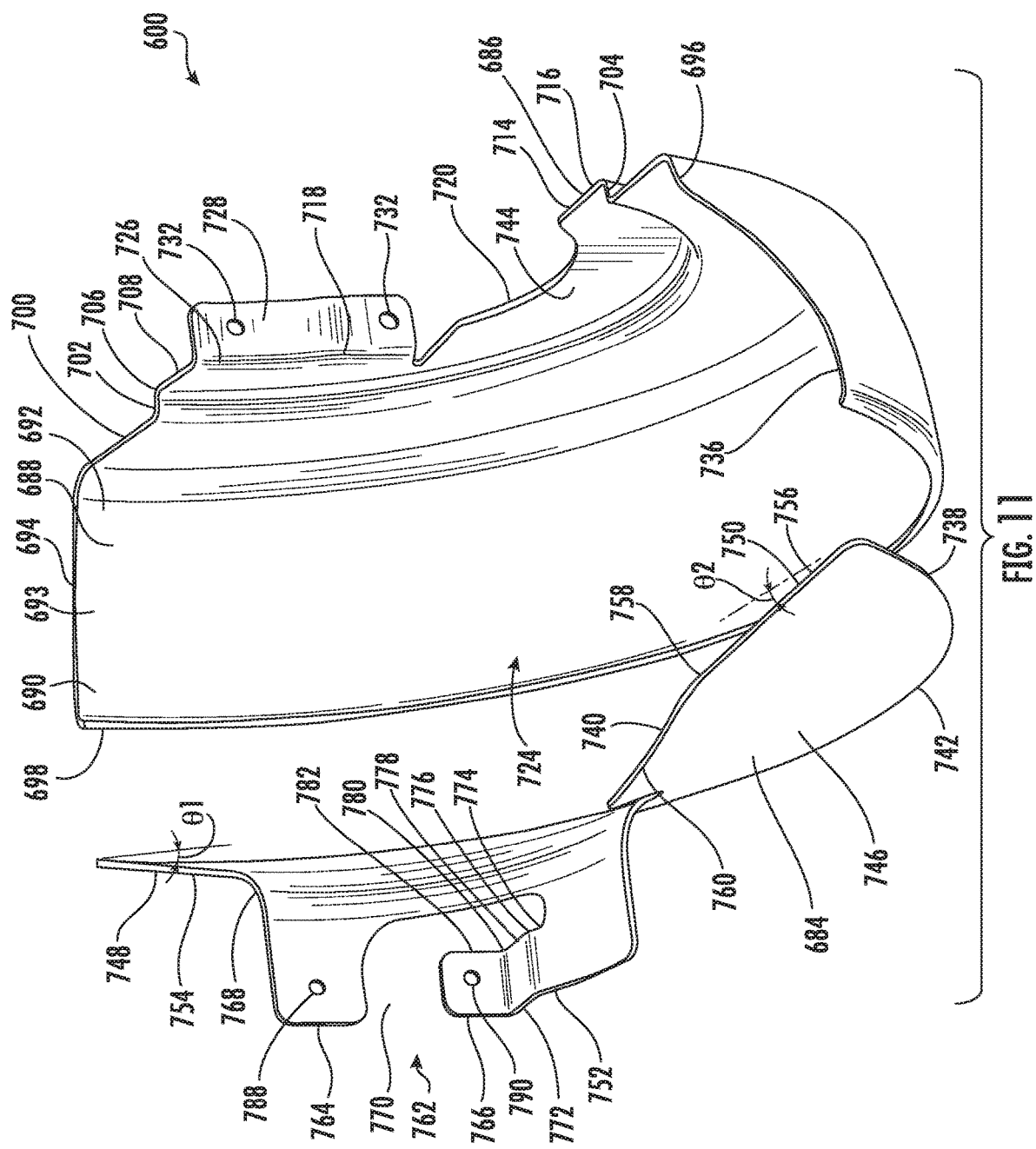
FIG. 11 is a schematic perspective exploded view of the lubrication fluid shroud illustrated in FIGS. 5-10A of the disclosure.

In accordance with the embodiment illustrated in FIGS. 10 and 11 and as a non-limiting example, the second shroud member 686 of the shroud 600 includes a base portion 688 having a first side portion 690, a second side portion 692, an intermediate portion 693, a first end 694 and a second end 696. The intermediate portion 693 of the base portion 688 of the second shroud member 686 is interposed between the first and second side portions 690 and 692 of the base portion 688. In accordance with the embodiment of the disclosure illustrated in FIGS. 6-11 and as a non-limiting example, the intermediate portion 693 of the base portion 688 of the second shroud member 686 may be substantially arcuate in shape. Additionally, in accordance with the embodiment of the disclosure illustrated in FIGS. 6-11 and as a non-limiting example, the intermediate portion 693 of the base portion 688 of the second shroud member 686 may have a shape that is complementary to the outermost surface 672 of the ring gear 613 of the drive unit assembly 602. Furthermore, in accordance with the embodiment of the disclosure illustrated in FIGS. 6-11 and as a non-limiting example, the intermediate portion 693 of the base portion 688 of the second shroud member 686 may be substantially flat.

Circumferentially extending inboard from at least a portion of the first side portion 690 of the base portion 688 of the second shroud member 686 is a shroud attachment portion 698. The shroud attachment portion 698 of the base portion 688 of the second shroud member 686 extends inboard toward the ring gear 613 of the drive unit assembly 602. It is within the scope of this disclosure and as a non-limiting example that the shroud attachment portion 698 extends perpendicular to or substantially perpendicular to the base portion 688 of the second shroud member 686 of the shroud 600.

Circumferentially extending from at least a portion of the second side portion 692 of the base portion 688 of the second shroud member 686 is a first substantially straight portion 700. As best seen in FIGS. 7 and 9-11 of the disclosure and as a non-limiting example, the first substantially straight portion 700 of the second shroud member 686 of the shroud 600 extends inboard toward the ring gear 613 of the drive unit assembly 602. In accordance with the embodiment of the disclosure illustrated in FIGS. 7 and 8 and as a non-limiting example, at least a portion of the first substantially straight portion 700 of the second shroud member 686 may be disposed directly adjacent to the first side 674 of the ring gear 613. As a result, it is to be understood that the first substantially straight portion 700 of the second shroud member 686 may be disposed directly adjacent to a side of the ring gear 613 opposite the plurality of ring gear teeth 682. It is within the scope of this disclosure and as a non-limiting example that the first substantially straight portion 700 of the second shroud member 686 may be substantially parallel to at least a portion of the first side 674 of the ring gear 613.

Extending outboard from at least a portion of the first substantially straight portion 700 of the second shroud member 686 is a first angularly bent portion 702. In accordance with the embodiment of the disclosure illustrated in FIGS. 7 and 9-11 and as a non-limiting example, the first angularly bent portion 702 extends outboard from an end of the first substantially straight portion 700 of the second shroud member 686 of the shroud 600 opposite the base portion 688 of the second shroud member 686. Additionally, in accordance with the embodiment of the disclosure illustrated in FIGS. 7 and 9-11 and as a non-limiting example, the first angularly bent portion 702 of the second shroud member 686 extends outboard away from the ring gear 613 of the drive unit assembly 602.

The second shroud member 686 of the shroud 600 may further include a second substantially straight portion 704 that extends outboard from an end of the first angularly bent portion 702 of the second shroud member 686 opposite the first substantially straight portion 700 of the second shroud member 686. In accordance with the embodiment of the disclosure illustrated in FIGS. 7 and 9-11 and as a non-limiting example the second substantially straight portion 704 of the second shroud member 686 of the shroud 600 extends outboard away from the ring gear 613 of the drive unit assembly 602. Additionally, in accordance with the embodiment of the disclosure illustrated in FIGS. 7 and 9-11 and as a non-limiting example the second substantially straight portion 704 of the second shroud member 686 extends substantially perpendicular to or extends perpendicular to the first substantially straight portion 700 of the second shroud member 686.

As best seen in FIGS. 7 and 9-11 of the disclosure and as a non-limiting example, the second part shroud of the shroud 600 may further include a second angularly bent portion 706 that extends from an end of the second substantially straight portion 704, opposite the first angularly bent portion 702 of the second shroud member 686 of the shroud 600. It is within the scope of this disclosure and as a non-limiting example that the second angularly bent portion 706 extends from the second substantial straight portion 704 of the second shroud member 686 away from the base portion 688 of the second shroud member 686.

In accordance with the embodiment of the disclosure illustrated in FIGS. 7 and 9-11 and as a non-limiting example, the second part shroud of the shroud 600 may further include a third substantially straight portion 708. At least a portion of the third substantially straight portion 708 of the second shroud member 686 of the shroud 600 may be disposed directly adjacent to the first side 674 of the ring gear 613. As best seen in FIGS. 7 and 9-11 and as a non-limiting example the third substantially straight portion 708 of the second part of the shroud 600 extends inboard from an end of the second angularly bent portion 704, opposite the second substantially straight portion 704 of the second shroud member 686. It is within the scope of this disclosure and as a non-limiting example that the third substantially straight portion 708 of the second shroud member 686 may extend substantially perpendicular to or perpendicular to the second substantially straight portion 704 of the second shroud member 686.

Additionally, it is within the scope of this disclosure and as a non-limiting example that the third substantially straight portion 708 of the second shroud member 686 of the shroud 600 may be substantially parallel to at least a portion of the first side 674 of the ring gear 613 of the drive unit assembly 602. Furthermore, it is within the scope of this disclosure and as a non-limiting example that the third substantially straight portion 708 of the second shroud member 686 extends in substantially the same direction as the first substantially straight portion 700 of the first shroud member 686.

According to the embodiment of the disclosure illustrated in FIG. 7 of the disclosure and as a non-limiting example, the first angularly bent portion 702, the second substantially straight portion 704, the second angularly bent portion 706 and the third substantially straight portion 708 may form first receiving portion 710. It is within the scope of this disclosure and as a non-limiting example that the first receiving portion 710 of the second shroud member 686 of the shroud 600 may be of a size and shape to receive at least a portion of a plurality of mechanical fasteners 712 connecting the ring gear 613 to the differential case 615. As a result, it is within the scope of this disclosure and as a non-limiting example that the third substantially flat portion 708 of the second part of the shroud 600 may be disposed outboard from and directly adjacent to at least a portion of one or more of the plurality of mechanical fasteners 712.

As best seen in FIGS. 10 and 11 of the disclosure and as a non-limiting example, the third substantially straight portion 708 of the second shroud member 686 of the shroud 600 may include a truncated portion 714 having a bottom portion 716 and a side portion 718. It is within the scope of this disclosure and as a non-limiting example that the bottom portion 716 of the truncated portion 714 of the second shroud member 686 may be substantially parallel to a center-line C1 of the ring gear 613 and the differential case 615 of the drive unit assembly 602.

Extending inboard from at least a portion of the bottom portion 716 of the truncated portion 714 of the third substantially straight portion 708 of the second shroud member 686 of the shroud 600, is a second receiving portion 720. In accordance with the embodiment of the disclosure illustrated in FIGS. 10 and 11 and as a non-limiting example, the second receiving portion 720 in the third substantially straight portion 708 of the second shroud member 686 may be substantially arcuate and concave in shape. It is within the scope of this disclosure and as a non-limiting example that the second receiving portion 720 may have a size and shape that is complementary to, and is able to receive at least a portion of, an outer surface of an end of the differential case (not shown), an outer surface of a bearing assembly (not shown) rotationally supporting an end of the differential case (not shown), and/or an outer surface of a second differential bearing cap 722. Additionally, it is within the scope of this disclosure and as a non-limiting example that the second receiving portion 720 of the second shroud member 686 of the shroud 600 may be used to regulate the amount of lubrication fluid (not shown) that migrates from the primary sump 628 to a secondary sump 724 within the shroud 600.

The side portion 718 of the truncated portion 714 of the second shroud member 686 of the shroud 600 extends outboard from the bottom portion 716 of the truncated portion 714 away from the second substantially straight portion 704 of the second shroud member 686. As best seen in FIGS. 7 and 9-11 of the disclosure and as a non-limiting example the side portion 718 of the third substantially straight portion 708 of the second shroud member 686 may include a third angularly bent portion 726 and an attachment portion 728. The third angularly bent portion 726 extends outboard away from the ring gear 613 from an end of the third substantially straight portion 708, opposite the second angularly bent portion 706 of the second shroud member 686.

Extending outboard from an end of the third angularly bent portion 726, opposite the third substantially straight portion 708, is the attachment portion 828. As best seen in FIGS. 7 and 9-11 of the disclosure and as a non-limiting example, the attachment portion 728 of the second shroud member 686 of the shroud 600 extends away from the ring gear 613 of the drive unit assembly 602. The attachment portion 728 may be used to integrally connect at least a portion of the second shroud member 686 of the shroud 600 to the second differential bearing cap 722 securing at least a portion of the differential bearing (not shown) to the inner surface 606 of the third housing part 614 of the housing 604. It is within the scope of this disclosure and as a non-limiting example that the attachment portion 728 of the second shroud member 686 may be connected to at least a portion of the outer surface 730 of the second differential bearing cap 722 by using one or more welds, one or more mechanical fasteners and/or one or more adhesives. As a result, it is to be understood that the attachment part 728 of the second shroud member 686 of the shroud 600 may have a shape that is complementary to the outer surface 730 of the second differential bearing cap 722 of the drive unit assembly 602.

According to an alternative embodiment of the disclosure (not shown) and as a non-limiting example, at least a portion of the attachment portion 728 of the second shroud member 686 may be integrally connected to at least a portion of the inner surface 606 of the housing 604. It is within the scope of this disclosure and as a non-limiting example that the attachment portion 728 of the second shroud member 686 may be connected to the inner surface 606 of the housing 604 by using one or more welds, one or more mechanical fasteners and/or one or more adhesives.

In accordance with the embodiment of the disclosure illustrated in FIGS. 7 and 9-11 and as a non-limiting example, the attachment portion 728 of the second shroud member 686 of the shroud 600 may include one or more second shroud member attachment apertures 732. The one or more second shroud member attachment apertures 732 have a size and shape to receive and/or retain at least a portion of one or more second shroud member mechanical fasteners 734. When assembled, at least a portion of the one or more second shroud member mechanical fasteners 734 are received and/or retained within at least a portion of the one or more second shroud member attachment apertures 732 and the second differential bearing cap 722 in order to secure the shroud 600 within the housing 604 of the drive unit assembly 602. It is within the scope of this disclosure and as a non-limiting example that the one or more second shroud member mechanical fasteners 734 may be one or more bolts or screws.

As best seen FIGS. 10 and 11 of the disclosure and as a non-limiting example, the second end 696 of the base portion 688 of the second shroud member 686 may include a pinion gear receiving portion 736. The pinion gear receiving portion 736 of the second shroud member 686 may be of a size and shape needed to receive at least a pinion gear 664 of the drive unit assembly 602. In accordance with the embodiment of the disclosure illustrated in FIGS. 10 and 11 and as a non-limiting example, the pinion gear receiving portion 736 of the second shroud member 686 extends inboard toward the primary sump 628 of the drive unit assembly 602. Additionally, in accordance with the embodiment of the disclosure illustrated in FIGS. 10 and 11 of the disclosure and as a non-limiting example, at least a portion of the pinion gear receiving portion 736 may extend through at least a portion of the first side portion 690 of the base portion 688, at least a portion of the second side portion 692 of the base portion 688, at least a portion of the intermediate portion 693 of the base portion 688, and/or at least a portion of the shroud attachment portion 698 of the base portion 688 of the second shroud member 686. It is within the scope of this disclosure and as a non-limiting example that the pinion gear receiving portion 736 of the second shroud member 686 may have a shape that is complementary to the outer surface 666 of the pinion gear 664 of the drive unit assembly 602. Additionally, it is within the scope of this disclosure and as a non-limiting example that the pinion gear receiving portion 736 of the second shroud member 686 may have a substantially arcuate in shape, substantially concave in shape, substantially semi-circular in shape, substantially rectangular in shape and/or substantially rectangular in shape.

The first shroud member 684 of the shroud 600 has an outer periphery 738 having a top portion 740 and a bottom portion 742. As best seen in FIGS. 10-11 of the disclosure and as a non-limiting example, at least a portion of the bottom portion 742 of the outer periphery 738 of the first shroud portion 684 may have a shape that is complementary to at least a portion of the first side portion 690 of the base portion 688 of the second shroud member 686. As a result, it is within the scope of this disclosure and as a non-limiting example that the bottom portion 742 of the outer periphery 738 of the first shroud member 684 may have a substantially arcuate shape.

When the shroud 600 is assembled, at least portion of the bottom portion 742 of the outer periphery 738 of the first shroud member 684 may be disposed directly adjacent to and axially inboard from at least a portion of an inner surface 744 of the shroud attachment portion 698 of the second shroud member 686. As a result, when the shroud 600 is assembled, at least a portion of the first shroud member 684 of the shroud 600 may be disposed outboard from and directly adjacent to at least a portion of the second side 676 of the ring gear 613 and/or at least a portion of the ring gear teeth 682 of the ring gear 613. Once at least a portion of the first shroud member 684 has been integrally connected to at least a portion of the second shroud member 686, a rigid unitary shroud 600 is formed.

As best seen in FIGS. 8 and 10 and as a non-limiting example, at least a portion of the shroud attachment portion 698 of the first shroud member 686 may be integrally connected to at least a portion of an outer surface 746 of the first shroud member 684. It is within the scope of this disclosure and as a non-limiting example that at least a portion of the first shroud member 684 may be integrally connected to at least a portion of the second shroud member 686 of the shroud 600 by using one or more welds, one or more mechanical fasteners, one or more adhesives and/or an interference fit. As a non-limiting example, the one or more welds 699 may be a MIG weld, a laser weld, an energy beam weld, a TIG weld, a Magnetic Pulse Weld, spot weld, a magnetic impelled arc butt weld and/or any other type of welding process that will fuse at least a portion of the first shroud member 686 to at least a portion of the second shroud member 686.

In accordance with the embodiment of the disclosure illustrated in FIGS. 8, 10 and 11 of the disclosure and as a non-limiting example, the top portion 740 of the outer periphery 738 of the first shroud member 684 has a first end portion 748, a second end portion 750 and an intermediate portion 752. As best seen in FIG. 11 of the disclosure and as a non-limiting example, at least a portion of the first end portion 748 of top portion 740 of the outer periphery 738 of the first shroud member 684 includes a fourth substantially straight portion 754. According to the embodiment illustrated in FIG. 11 and as a non-limiting example, at least a portion of the fourth substantially straight portion 754 of the first shroud member 684 extends inboard toward the ring gear 613 away from the base portion 688 of the second shroud member 686. It is within the scope of this disclosure and as a non-limiting example that the fourth substantially straight portion 754 of the first shroud member 684 may extend at an angle θ1 relative to the second side 678 of the ring gear 613. As a result, it is within the scope of this disclosure and as a non-limiting example that the fourth substantially straight portion 754 of the first shroud member 684 may extend inboard along at least a portion of the second side 678 of the ring gear 613 but non-parallel to the second side 678 of the ring gear 613.

At least a portion of the second end portion 750 of the top portion 740 of the outer periphery 738 of the first shroud member 684 may include a fifth substantially straight portion 756, a fourth angularly bent portion 758 and a sixth substantially straight portion 760. At least a portion of the fifth substantially straight portion 756 may be connected to an end of the fourth angularly bent portion 758 opposite the sixth substantially straight portion 760 of the first shroud member 684. According to an embodiment of the disclosure and as a non-limiting example, at least a portion of the fifth substantially straight portion 765 of the first shroud member 684 extends inboard toward the ring gear 613 away from the base portion 688 of the second shroud member 686. It is within the scope of this disclosure and as a non-limiting example that the fifth substantially straight portion 765 of the first shroud member 684 may extend at an angle θ2 relative to the second side 678 of the ring gear 613. As a result, it is within the scope of this disclosure and as a non-limiting example that the fifth substantially straight portion 765 of the first shroud member 684 may extend inboard along at least a portion of the second side 678 of the ring gear 613 but non-parallel to the second side 678 of the ring gear 613. It is within the scope of this disclosure and as a non-limiting example that the angle θ2 of the fifth substantially straight portion 765 may be substantially equal to the angle θ1 of the fourth substantially straight portion 754 of the first shroud member 684.

As best seen in FIGS. 10 and 11 of the disclosure and as a non-limiting example, at least a portion of the fourth angularly bent portion 758 of the top portion 740 of the outer periphery 738 of the first shroud member 684 extends outboard away from the second side 678 of the ring gear 613. It is therefore to be understood that the fourth angularly bent portion 758 of the first shroud member 684 increases the gap between the first shroud member 684 and the second side 678 of the ring gear 613.

According to the embodiment illustrated in FIGS. 10 and 11 and as a non-limiting example, the sixth substantially straight portion 760 of the top portion 740 of the outer periphery 738 of the first shroud member 684 extends substantially parallel to the second side 678 and therefore the plurality of ring gear teeth 682 of the ring gear 613.

At least a portion of the intermediate portion 752 of the top portion 740 of the outer periphery 738 of the first shroud member 684 defines an attachment portion 762. In accordance with the embodiment of the disclosure illustrated in FIGS. 8, 10 and 11 and as a non-limiting example the attachment portion 762 of the first shroud member 684 may have a first portion 764 and a second portion 766. As best seen in FIGS. 8, 10 and 11 and as a non-limiting example, at least a portion of the first and second portions 764 and 766 extend outboard from a fifth angularly bent portion 768 connected to an end of the fourth substantially straight portion 754 of the first shroud member 684 opposite the base portion 688 of the second shroud member 686. It is therefore to be understood that the fifth angularly bent portion 768 and the first and second portions 764 and 766 of the attachment portion 762 extend outboard away from the second side 678 of the ring gear 613. As a non-limiting example, the first and second portions 764 and 766 of the attachment portion 762 of the first shroud member 684 may be substantially perpendicular to or perpendicular to the fourth and/or sixth substantially straight portions 754 and/or 760 of the first shroud member 684.

In accordance with the embodiment illustrated in FIG. 11 and as a non-limiting example, the first portion 764 of the attachment portion 762 of the first shroud member 762 and the second portion 766 of the attachment portion 762 are separated by a gap 770. It is within the scope of this disclosure and as a non-limiting example that the second portion 766 of the attachment portion 762 of the first shroud member 684 includes an attachment arm 772 extending from an end of the second portion 766 opposite the fifth angularly bent portion 768 of the first shroud member 684. As best seen in FIG. 11 of the disclosure and as a non-limiting example, at least a portion of the attachment arm 772 extends toward the first portion 764 of the attachment portion 762 of the first shroud member 684 of the shroud 600.

It is within the scope of this disclosure and as a non-limiting example that the attachment arm 772 of the attachment portion 762 of the first shroud member 684 may include a seventh substantially straight portion 774, a sixth angularly bent portion 776, an eighth substantially straight portion 778, a seventh angularly bent portion 780 and/or a ninth substantially straight portion 782. As best seen in FIG. 11 of the disclosure and as a non-limiting example, the seventh substantially straight portion 774 may be connected to an end of the sixth angularly bent portion 776 opposite the eighth substantially straight portion 778 of the attachment arm 772. Additionally, as best seen in FIG. 11 and as a non-limiting example, the ninth substantially straight portion 782 may be connected to an end of the seventh angularly bent portion 780 opposite the eighth substantially straight portion 778 of the attachment arm 772. Furthermore, as illustrated in FIG. 11 and as a non-limiting example, the sixth angularly bent portion 776 and the eighth substantially straight portion 778 of the attachment arm 772 of the attachment portion 762 extends outboard from the seventh substantially straight portion 774 toward the base portion 688 of the second shroud member 686 of the shroud 600. Still further, the seventh angularly bent portion 780 and the ninth substantially straight portion 782 of the attachment arm 772 of the attachment portion 762 extends toward the first portion 764 of the attachment portion 762 of the first shroud member 684 of the shroud 600.

At least a portion of the first and second portions 764 and 766 of the attachment portion 762 of the first shroud member 684 are integrally connected to at least a portion of an outer surface 784 of a first differential bearing cap 786 of the drive unit assembly 602. It is within the scope of this disclosure and as a non-limiting example that the first and second portions 764 and 766 of the attachment portion 762 of the first shroud member 684 may be integrally connected to the first differential bearing cap 786 by using one or more welds, one or more mechanical fasteners and/or one or more adhesives.

In accordance with an alternative embodiment of the disclosure (not shown) and as a non-limiting example, at least a portion of the attachment portion 762 of the first shroud member 684 may be integrally connected to at least a portion of the inner surface 606 of the housing 604. It is within the scope of this disclosure and as a non-limiting example that the attachment portion 762 of the first shroud member 684 may be connected to the inner surface 606 of the housing 604 by using one or more welds, one or more mechanical fasteners and/or one or more adhesives.

According to the embodiment of the disclosure illustrated in FIGS. 8 and 10 and as a non-limiting example, the first portion 764 of the attachment portion 762 may include one or more first part attachment apertures 788. Additionally, according to the embodiment of the disclosure illustrated in FIGS. 8 and 10 and as a non-limiting example, the ninth substantially straight portion 782 of the second part 752 of the attachment portion 762 of the first shroud portion 684 of the shroud 600 may include one or more second part attachment apertures 790. The one or more first and second part attachment apertures 788 and 790 of the attachment portion 762 of the shroud 600 are of a size and shape to receive and/or retain at least a portion of one or more first shroud member mechanical fasteners 792. When assembled, at least a portion of the one or more first shroud member mechanical fasteners 792 are received and/or retained within at least a portion of the first differential bearing cap 786 and the one or more first and second part attachment apertures 788 and 790 of the attachment portion 762 in order to secure the shroud 600 within the housing 604 of the drive unit assembly 602. It is within the scope of this disclosure and as a non-limiting example that the one or more first shroud member mechanical fasteners 792 may be one or more bolts or screws.

As best seen in FIG. 5 of the disclosure and as a non-limiting example, when the shroud 600 is assembled within the housing 604 of the drive unit assembly 602, at least a portion of the first end 696 of the shroud 600 may be disposed directly adjacent to at least a portion of the pinion gear 664. Additionally, as best seen in FIG. 5 of the disclosure and as a non-limiting example, when the shroud 600 is assembled within the housing 604, at least a portion of the first end 694 extends above the center-line C1 of the ring gear 613 and the differential case 615 of the drive unit assembly 602. It is within the scope of this disclosure and as a non-limiting example that first end 694 of the shroud 600 extends around the ring gear 613 to an angle θ3 above the horizontal center-line C1 of the ring gear 613 and the differential case 615 of the drive unit assembly 602. By altering the angle θ3 defining the location around the ring gear 613 where the first end 694 of the shroud 600 will end, the direction in which the lubricant fluid (not shown) travels within the housing 604 of the drive unit assembly can be controlled. This allows the shroud 600 to be customizable in order to ensure that all of the meshing components of the drive unit assembly 602 receive a pre-determined amount of lubricant fluid needed when in operation. As a non-limiting example, the angle θ3 may be from approximately 5° to approximately 115° from the center-line C1 of the ring gear 613 and the differential case 615 of the drive unit assembly 602. Additionally, as a non-limiting example, the angle θ3 may be from approximately 0° to approximately 180° from the center-line C1 of the ring gear 613.

Once the drive unit assembly 602 has ceased engagement in an operational state, the lubrication fluid (not shown) disposed within the housing 604 gradually settles into the primary sump 628 in the bottom of the housing 604. As the lubrication fluid settles within the primary sump 628, the level of the lubricant fluid (not shown) rises. Once the level of the lubrication fluid (not shown) reaches a pre-determined depth, the lubrication fluid will flow over the second receiving portion 720 of the second shroud member 686 thereby allowing the lubrication fluid to flow into and begin to fill up the secondary sump 724 within the interior of the shroud 600 contacting the ring gear 613. After a pre-determined amount of lubricant fluid (not shown) has entered into the secondary sump 724, the overall level of the lubrication within the primary sump 628 will be substantially equal to or less than the level of the second receiving portion 720. This will prevent the further migration of an additional amount lubrication fluid (not shown) from the primary sump 628 into the secondary sump 724.

Upon start-up, the pinion gear 664 rotates the ring gear 613 within the interior of the shroud 600. As the ring gear 613 rotates within the shroud 600, an amount of lubrication fluid (not shown) is retained on the outer surface 678 of the ring gear 613. The centrifugal forces experienced by the lubrication fluid (not shown) on the outer surface 678 of the ring gear 613 when in operation, expels (or throws or discharges) an amount of the lubrication fluid from the ring gear 613 and out of the secondary sump 724. As a result, it is to be understood that the ring gear 613 of the drive unit assembly 602 acts like a pump as it removes a pre-determined amount of lubrication fluid (not shown) from the secondary sump 724 within the shroud 600 and into the primary sump 628 within the housing 604.

Once the ring gear 613 has removed a pre-determined about of lubrication fluid (not shown) from the secondary sump 724, the secondary sump 724 will be maintained at its pre-determiner optimal depth. When the secondary sump 724 has reached its pre-determined operating level or depth, only the tip of the ring gear will rotate through the lubrication fluid (not shown). As a result, it is to be understood that the level of lubrication fluid (not shown) within the secondary sump 724 may be deep enough to properly lubricate the pinion gear 664 and the ring gear 613 but shallow enough to minimize the amount of lubrication fluid that the ring gear 613 needs to rotate through when in operation. By reducing the overall amount of lubrication fluid that the ring gear 613 has to rotate through when in operation, the amount of resistance experienced by the ring gear 613 is reduced and the amount of parasitic losses, such as but not limited to churning losses, are reduced. As a result, the shroud 600 aids in increasing the overall efficiency of the drive unit assembly 602 and aids in increasing the overall amount of rotational power that is transmitted through the drive unit assembly 602.

Additionally, it is to be understood that the shroud 600 of the drive unit assembly 602, also aids in preventing the migration of wear particles (not shown) from the primary sump 628, into the secondary sump 724 and into direct contact with the various meshing components of the drive unit assembly 602. Furthermore, it is to be understood that the shroud 600 aids in preventing the ring gear 613 from coming into direct contact with the lubrication fluid (not shown) within the primary sump 628. This prevents the ring gear 613 from creating an amount of turbulent flow within the primary sump 628 thereby allowing the wear particles (not shown) to settle and be retained within the primary sump 628 of the drive unit assembly 602. As a result, the shroud 600 further aids in improving the overall life and durability of the drive unit assembly 602.

It is within the scope of this disclosure and as a non-limiting example, that the angle θ3 of the first end 694 of the shroud 600 may be such that the inner surface 744 of the shroud 600 is able to catch, collect and/or retain an amount of lubrication fluid (not shown) retained and expelled from the outer surface 678 of the ring gear 613. This allows the shroud 600 to actively maintain and/or replenish the level of the lubrication fluid (not shown) within the secondary sump 724 within the shroud when the drive unit assembly 602 is in operation. This aids in ensuring that the lubrication fluid level (not shown) within the secondary sump 724 is maintained at its pre-determined optimal level at all times when in operation.

In accordance with the embodiment of the disclosure where the first and second shroud members 684 and 686 are connected using one or more mechanical fasteners, it allows for the selective removal of either the first or second shroud members 684 or 686 from the drive unit assembly 602. This allows for the removal of just the first or second shroud members 684 or 686 from the drive unit assembly 602 when the drive unit assembly 602 is in need of service and/or repairs. As a result, the ring gear shroud 600 makes accessing various components of the drive unit assembly 602 quicker and easier when the drive unit assembly is in need of service and/or repairs.

Figure 12:
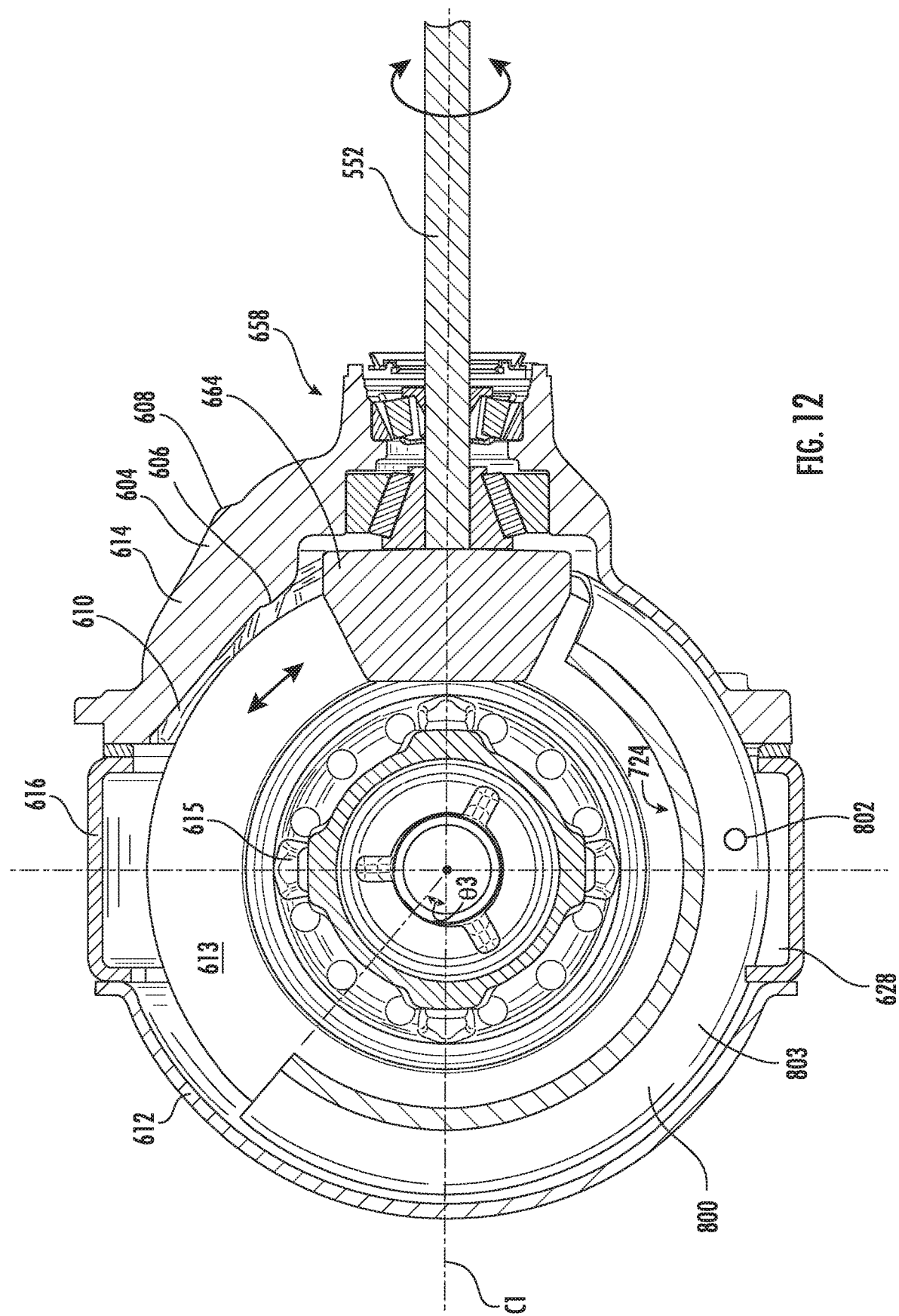
FIG. 12 provides a partial cut-away side-view of a drive unit drive unit assembly having a lubrication fluid shroud according to an alternative embodiment of the disclosure.

FIG. 12 provides a partial cut-away side-view of a drive unit drive unit assembly 602 having a shroud 800 according to an alternative embodiment of the disclosure. The shroud 800 illustrated in FIG. 12 is the same as the shroud 600 illustrated in FIGS. 5-11, except where specifically noted below. In accordance with the embodiment of the disclosure illustrated in FIG. 12 and as a non-limiting example, the shroud 800 includes one or more lubricant fluid apertures 802. It is within the scope of this disclosure and as a non-limiting example that the one or more lubricant fluid apertures 802 may be disposed in a body portion 803 of the first shroud member 684 of the shroud 800. Additionally, it is within the scope of this disclosure and as a non-limiting example that one or more lubricant fluid apertures 802 may be disposed in the base portion 688, the first substantially straight portion 700 and/or the third substantially straight portion 708 of the second shroud member 686 of the shroud 800. As a non-limiting example, the one or more lubricant fluid apertures 802 may be substantially circular, substantially elliptical, substantially square, substantially polygonal, substantially triangular, substantially rectangular, substantially oval, substantially squircle, substantially rhomboidal, substantially diamond, substantially trapezoidal and/or substantially egg-shaped.

When the drive unit assembly 602 is in operation, the ring gear 613 will rotate within the shroud 800 creating a secondary sump 724 with a lower pressure than that of the primary sump 628 within the housing 604. As a result, the lubrication fluid from within the primary sump 626 in the housing 604 is drawn into the secondary sump 724 within the shroud 800. This allows the lubrication fluid level (not shown) within the secondary sump 724 to be replenished as lubrication fluid is expelled (or thrown or discharged) from within the secondary sump 724 by the rotation of the ring gear 613 when in operation.

The one or more lubricant fluid apertures 802 in the shroud 800 may be of a size, shape and/or number needed in order to regulate and/or control the amount of lubrication fluid (not shown) that migrates from the primary sump 628 within the housing 604 into the secondary sump 724 within the shroud 800. Additionally, the one or more lubricant fluid apertures 802 in the shroud 800 may be of a size, shape and/or number needed in order to regulate and/or control the speed in which the lubrication fluid (not shown) is able to migrate from the primary sump 628 and into the secondary sump 724 of the drive unit assembly 602. It is to be understood that by altering the number, location, size and/or shape of the one or more lubricant fluid apertures 802 within the shroud 800, the amount of lubrication fluid entering into the secondary sump 724 from the primary sump 628 may be controlled as needed to meet the needs of a particular application. As a result, by altering the number, location, size and/or shape of the one or more lubricant fluid apertures 802 the amount of lubricating fluid expelled (or thrown or discharged) from within the secondary sump 724 by the rotation of the ring gear 613 may be substantially equal to the amount of lubrication fluid (not shown) entering into the secondary sump 724 of the shroud 800. This aids in ensuring that the level of the lubrication fluid (not shown) within the secondary sump 724 of the shroud 800 is precisely maintained at a pre-determined optimal operating level at all times when the drive unit assembly 602 is in operation.

Figure 13:
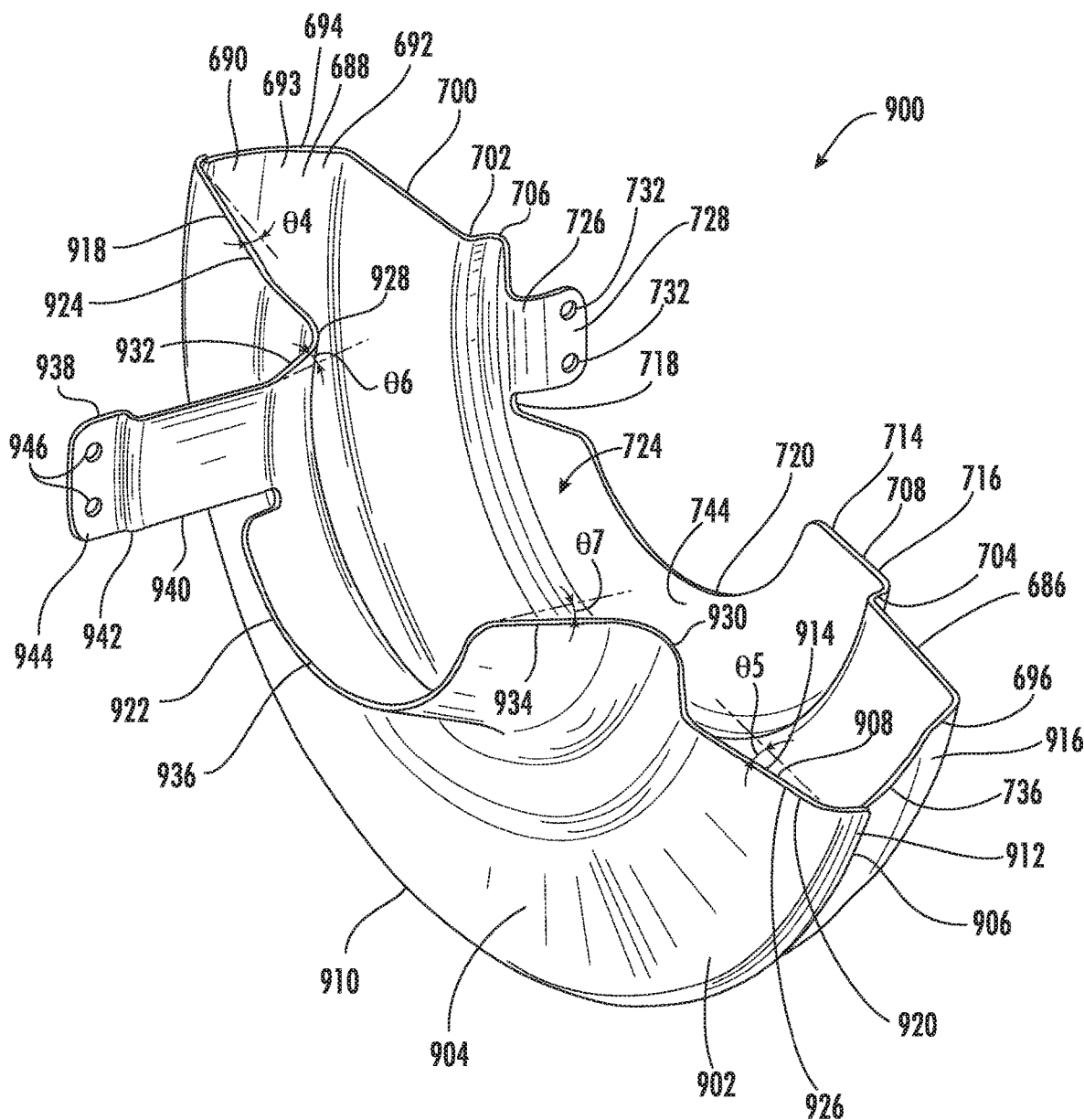
FIG. 13 is a schematic perspective view of a lubrication fluid shroud according to another embodiment of the disclosure.

FIG. 13 is a schematic perspective view of a shroud 900 according to another embodiment of the disclosure. The shroud 900 illustrated in FIG. 13 is the same as the shrouds 600 and 800 illustrated in FIGS. 5-12, except where specifically noted below. As illustrated in FIG. 13 of the disclosure and as a non-limiting example, the shroud 900 includes a first shroud member 902 and the second shroud member 686.

Additionally, as best seen in FIG. 13 and as a non-limiting example, the first side portion 690 of the base portion 688 of the second shroud member 686 does not include the shroud attachment portion 698 illustrated in FIGS. 8 and 10-11 of the disclosure.

In accordance with the embodiment of the disclosure illustrated in FIG. 13 of the disclosure and as a non-limiting example, the first shroud member 902 of the shroud 900 has a body portion 904 with an outer periphery 906 with a top portion 908 and a bottom portion 910. As best seen in FIG. 13 of the disclosure and as a non-limiting example, the bottom portion 910 of the outer periphery 906 of the first shroud member 902 of the shroud 900 may include a shroud attachment portion 912. The shroud attachment portion 912 of the first shroud member 902 circumferentially extends inboard from at least a portion of the bottom portion 910 of the outer periphery 906 of the first shroud member 902 toward the ring gear 613 and/or the second shroud member 686 of the shroud 900. It is within the scope of this disclosure and as a non-limiting example that the shroud attachment portion 912 of the first shroud member 902 may be substantially parallel to the outermost surface 672 of the ring gear 613. Additionally, it is within the scope of this disclosure and as a non-limiting example that the shroud attachment portion 912 of the first shroud member 902 may have a shape that is complementary to the base portion 688 of the second shroud member 686 of the shroud 900.

When the shroud 900 is assembled, at least a portion of the shroud attachment portion 912 may be in direct contact with at least a portion of the first side portion 690 of the base portion 688 of the second shroud member 686. In accordance with the embodiment illustrated in FIG. 13 and as a non-limiting example, when the shroud 900 is assembled, at least a portion of an inner surface 914 of the shroud attachment portion 912 may be in direct contact with at least a portion of the outer surface 916 of the first side portion 690 of the base portion 688 of the second shroud member 686. As a result, when the shroud 900 is assembled, at least a portion of the first shroud member 902 of the shroud 900 may be disposed outboard from and directly adjacent to at least a portion of the second side 676 of the ring gear 613 and/or and at least a portion of the ring gear teeth 682 of the ring gear 613. Once the first shroud member 902 has been integrally connected to the second shroud member 686, a rigid unitary shroud 900 is formed.

According to the embodiment of the disclosure illustrated in FIG. 13 and as a non-limiting example, at least a portion of the shroud attachment portion 912 may be integrally connected to at least a portion of the first side portion 690 of the base portion 688 of the second shroud member 686. It is within the scope of this disclosure and as a non-limiting example that the first shroud member 902 may be integrally connected to the second shroud member 686 by using one or more welds, one or more mechanical fasteners, one or more adhesives and/or an interference fit. As a non-limiting example, the weld may be a MIG weld, a laser weld, an energy beam weld, a TIG weld, a Magnetic Pulse Weld, spot weld, a magnetic impelled arc butt weld and/or any other type of welding process that will fuse at least a portion of the shroud attachment portion 912 of the first shroud member 902 to at least a portion of the second shroud member 686.

As illustrated in FIG. 13 and as a non-limiting example, the top portion 908 of the outer periphery 906 of the of the first shroud member 902 has a first end portion 918, a second end portion 920 and an intermediate portion 922 interposed between the first and second end portions 918 and 920 of the first shroud member 902. In accordance with the embodiment illustrated in FIG. 13 and as a non-limiting example, the first end portion 918 of the top portion 908 of the outer periphery 906 of the first shroud member 902 may include a tenth substantially straight portion 924. According to an embodiment of the disclosure and as a non-limiting example, at least a portion of the tenth substantially straight portion 924 of the first shroud member 902 extends inboard toward the ring gear 613 away from the base portion 688 of the second shroud member 686. It is within the scope of this disclosure and as a non-limiting example that the tenth substantially straight portion 924 of the first shroud member 902 may extend at an angle θ4 relative to the second side 678 of the ring gear 613. As a result, it is within the scope of this disclosure and as a non-limiting example that the tenth substantially straight portion 924 of the first shroud member 902 may extend inboard along at least a portion of the second side 678 of the ring gear 613 but non-parallel to the second side 678 of the ring gear 613.

At least a portion of the second end portion 920 of the top portion 908 of the outer periphery 906 of the first shroud member 902 may include an eleventh substantially straight portion 926. According to an embodiment of the disclosure and as a non-limiting example, at least a portion of the eleventh substantially straight portion 926 of the first shroud member 902 extends inboard toward the ring gear 613 away from the base portion 688 of the second shroud member 686. It is within the scope of this disclosure and as a non-limiting example that the eleventh substantially straight portion 926 of the first shroud member 902 may extend at an angle θ5 relative to the second side 678 of the ring gear 613. As a result, it is within the scope of this disclosure and as a non-limiting example that the eleventh substantially straight portion 926 of the first shroud member 902 may extend inboard along at least a portion of the second side 678 of the ring gear 613 but non-parallel to the second side 678 of the ring gear 613. It is within the scope of this disclosure and as a non-limiting example that the angle θ5 of the eleventh substantially straight portion 926 may be substantially equal to the angle θ4 of the tenth substantially straight portion 924 of the first shroud member 902.

In accordance with the embodiment of the disclosure illustrated in FIG. 13 and as a non-limiting example, at least a portion of the intermediate portion 922 of the top portion 908 of the outer periphery 906 of the first shroud member 902 may include a first substantially concave portion 928 and/or a second substantially concave portion 930. As best seen in FIG. 13 of the disclosure and as a non-limiting example, at least a portion of the first substantially concave portion 928 may be connected to an end of the tenth substantially straight portion 926 opposite the shroud attachment portion 912. Additionally, as best seen in FIG. 13 of the disclosure and as a non-limiting example, at least a portion of the second substantially arcuate portion 930 may be connected to an end of the eleventh substantially straight portion 926 opposite the shroud attachment portion 912 of the shroud 900.

According to the embodiment illustrated in FIG. 13 and as a non-limiting example, at least a portion of the first and second substantially concave portions 928 and 930 of the first shroud member 902 may extend along the body portion 904 of the first shroud member 902 toward the base portion 688 of the second shroud member 686. It is within the scope of this disclosure and as a non-limiting example that the first and second substantially concave portions 928 and 930 may extend along the body portion 904 of the first shroud member 902 in a substantially arcuate manner. Additionally, it is within the scope of this disclosure and as a non-limiting example that the first and second substantially concave portions 928 and 930 of the first shroud member 902 connect with each other at a point within the body portion 904 of the first shroud member 902. Furthermore, it is within the scope of this disclosure and as a non-limiting example that the first and second substantially concave portions 928 and 930 of the first shroud member 902 may extend along the body portion 904 of the first shroud member 902 in a substantially circular manner.

The top portion 908 of the outer periphery 906 of the first shroud member 902 of the shroud 900 may further include a twelfth substantially straight portion 932. As best seen in FIG. 13 of the disclosure and as a non-limiting example, at least a portion of the twelfth substantially straight portion 932 of the first shroud member 902 circumferentially extends outboard from at least a portion of an end of the first substantially concave portion 928 opposite the tenth substantially straight portion 924. Additionally, as best seen in FIG. 13 of the disclosure and as a non-limiting example the twelfth substantially straight portion 932 of the first shroud member 902 extends outboard away from the ring gear 613. It is within the scope of this disclosure and as a non-limiting example that the twelfth substantially straight portion 932 may extend outboard away from the ring gear 613 at an angle θ6.

A thirteenth substantially straight portion 934 may extend outboard from at least a portion of an end of the second substantially concave portion 930, opposite the eleventh substantially straight portion 926, along the intermediate portion 922 of the top portion 908 of the outer periphery 906 of the first shroud member 902. As best seen in FIG. 13 of the disclosure and as a non-limiting example, the thirteenth substantially straight portion 934 of the first shroud member 902 extends outboard away from the ring gear 613. Additionally, as best seen in FIG. 13 of the disclosure and as a non-limiting example, the thirteenth substantially straight portion 934 may extend outboard away from the ring gear 613 at an angle θ7. It is within the scope of this disclosure and as a non-limiting example, the angle θ7 of the thirteenth substantially straight portion 943 may be substantially equal to the angle θ6 of the twelfth substantially straight portion 932 of the shroud 902.

In accordance with the embodiment of the disclosure where the first and second substantially arcuate portions 928 and 930 extend along the body portion 904 of the first shroud member 902 toward the base portion 688, the twelfth and thirteenth substantially straight portions 932 and 934 may extend along the body portion 904 of the first shroud member 902 toward the base portion 688. As a result, it is within the scope of this disclosure and as a non-limiting example that at least a portion of the twelfth and thirteenth substantially straight portions 932 and 934 may circumferentially extend outboard from at least a portion of the first and second substantially arcuate portions 928 and 930 into the body portion 904 of the first shroud member 902. As best seen in FIG. 13 of the disclosure and as non-limiting example, the twelfth and thirteenth substantially straight portions 932 and 934 may extend into the body portion 904 of the first shroud member 902 toward the base portion 688 and connect with each other at a point within the body portion 904 of the first shroud member 902. It is within the scope of this disclosure and as a non-limiting example that the twelfth and thirteenth substantially straight portions 932 and 934 may form a substantially conical shape, a substantially truncated conical shape, a substantially frustum shape and/or a substantially frusto-conical shape.

It is to be understood that the twelfth and thirteenth substantially straight portions 932 and 934 of the first shroud member 902 form one or more differential shield portions 936. The one or more differential shield portions 936 of the first shroud member 902 of the shroud 900 may be used in order to shield at least a portion of the differential case 615 and the differential gear set (not shown) from the lubrication fluid (not shown) within the primary sump 628 when the drive unit assembly 602 is in operation. In particular, it is within the scope of this disclosure and as a non-limiting example that the one or more differential shield portions 936 of the first shroud member 902 may cover one or more of the apertures or windows (not shown) that are disposed within the differential case 615. This aids in reducing the overall amount of lubrication fluid that the various components of the differential gear set (not shown) rotate through when in operation. As a result, it is therefore to be understood that this aids in reducing the overall churning loss experienced by the differential gear set (not shown) and the drive unit assembly 602 and increases the overall efficiency of the drive unit assembly 602.

Additionally, it is within the scope of this disclosure and as a non-limiting example that the sloped shape of the one or more differential shield portions 936 of the first shroud member 902 may allow for the collection of an amount of lubrication fluid from the differential case 615 and the differential gear set (not shown). The lubrication fluid (not shown) collected by the one or more differential shield portions 936 of the shroud 900 may then be directed into the secondary sump 724 of the shroud 900 in order to replenish the amount of lubrication fluid within the secondary sump 724 while the drive unit assembly 602 is in operation. As a result, the one or more differential shield portions 936 aids in ensuring that the secondary sump 724 of the shroud 900 is maintained at its pre-determined optimal operating level at all times when the drive unit assembly 602 is in operation.

An attachment portion 938 may extend outboard from at least a portion of the twelfth and/or thirteenth substantially straight portions 932 and/or 934 of the first shroud member 902. As best seen in FIG. 13 of the disclosure and as a non-limiting example, the attachment portion 938 extends outboard away from the ring gear 613. The attachment portion 938 of the first shroud member 902 includes a fourteenth substantially straight portion 940 extending outboard away from the ring gear 613 from the twelfth and/or thirteenth substantially straight portions 932 and/or 934. A substantially S-shaped portion 942 may extend from an end of the fourteenth substantially straight portion 940 opposite the twelfth and/or thirteenth substantially straight portions 932 and/or 934 of the first shroud member 902.

Extending outboard from at least a portion of an end of the substantially S-shaped portion 942 of the attachment portion 938, opposite the fourteenth substantially straight portion 940, is a fifteenth substantially straight portion 944. As best seen in FIG. 13 of the disclosure and as a non-limiting example, the fifteenth substantially straight portion 944 extends outboard away from the ring gear 613. It is within the scope of this disclosure and as a non-limiting example that the fifteenth substantially straight portion 944 may be substantially parallel to the fourteenth substantially straight portion 940 of the attachment portion 938 of the first shroud member 902.

When assembled, at least a portion of the fifteenth substantially straight portion 944 of the attachment portion 938 of the first shroud member 902 may be integrally connected to at least a portion of the outer surface 784 of the first differential bearing cap 786 of the drive unit assembly 602. It is within the scope of this disclosure and as a non-limiting example that the attachment portion 938 may be connected to the first differential bearing cap 786 by using one or more welds, one or more mechanical fasteners and/or one or more adhesives.

One or more attachment apertures 946 extend through the fifteenth substantially straight portion 944 of the attachment portion 938 of the first shroud member 902. The one or more attachment apertures 946 are of a size and shape to receive and/or retain at least a portion of the one or more first shroud member mechanical fasteners 792. When assembled, at least a portion of the one or more first shroud member mechanical fasteners 792 are received and/or retained within at least a portion of the first differential bearing cap 786 and the one or more attachment apertures 946 of the attachment portion 938 in order to secure the shroud 900 within the housing 604 of the drive unit assembly 602.

Figure 14:
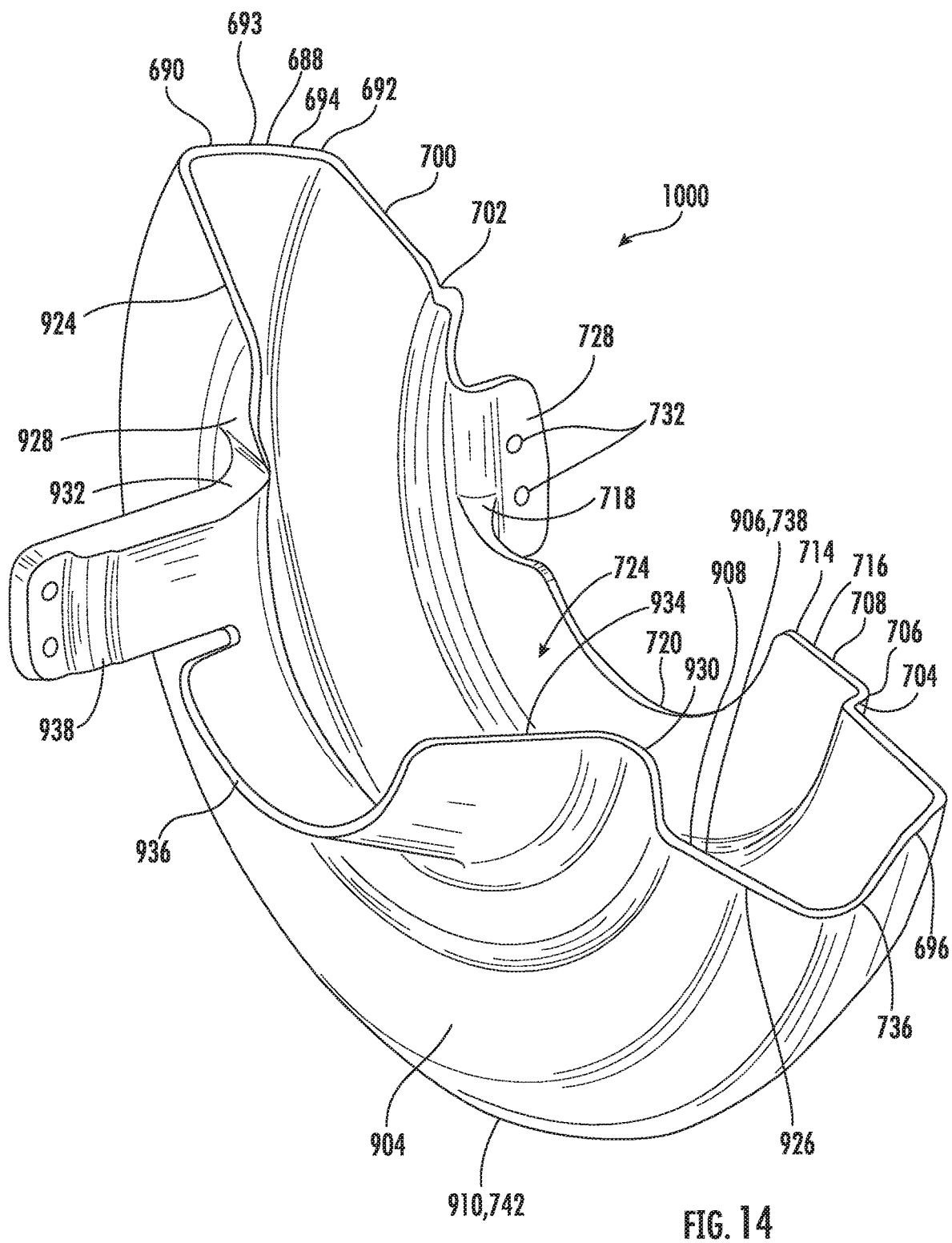
FIG. 14 is a schematic perspective view of the lubrication fluid shroud according to yet another embodiment of the disclosure.

FIG. 14 is a schematic perspective view of a shroud 1000 according to yet another embodiment of the disclosure. The shroud 1000 illustrated in FIG. 14 is the same as the shrouds 600, 800 and 900 illustrated in FIGS. 5-13, except where specifically noted below. As illustrated in FIG. 14 of the disclosure, the shroud 1000 does not include shroud attachment portion 912 of the first shroud member 902 or the shroud attachment portion 698 of the base portion 688 of the second shroud member 686 illustrated in FIGS. 5-13 of the disclosure.

In accordance with the embodiment of the disclosure illustrated in FIG. 14 and as a non-limiting example, the shroud 1000 is a single piece unitary shroud. As a result, as illustrated in FIG. 14 of the disclosure and as a non-limiting example, at least a portion of the bottom portion 742, 910 of the outer periphery 906, 738 is integrally formed as part of the first side portion 690 of the base portion 688 of the shroud 1000.

The shroud 1000 illustrated in FIG. 14 has the same structural features as previously described herein in relation to the shrouds 602, 800 and 900 illustrated in FIGS. 5-13 of the disclosure. Additionally, the shroud 1000 illustrated in FIG. 14 performs the same functions as previously described in relation to the shrouds 602, 800 and 900 illustrated in FIGS. 5-13 of the disclosure.

It is to be understood that the various embodiments described in this specification and as illustrated in the attached drawings are simply exemplary embodiments illustrating the inventive concepts as defined in the claims. As a result, it is to be understood that the various embodiments described and illustrated may be combined to from the inventive concepts defined in the appended claims.

In accordance with the provisions of the patent statutes, the present invention has been described to represent what is considered to represent the preferred embodiments. However, it should be note that this invention can be practiced in other ways than those specifically illustrated and described without departing from the spirit or scope of this invention.

What is claimed is:

1. A drive unit assembly, comprising:
a ring gear having an outermost surface, an innermost surface, a first side and a second side;
a shroud comprising a first shroud member and a second shroud member;
wherein at least a portion of said first shroud member is integrally connected to at least a portion of said second shroud member;
wherein at least a portion of a base portion of said second shroud member is disposed outboard from said outermost surface of said ring gear and has a shape that is complementary to said outermost surface of said ring gear;

wherein said first shroud member has an outer periphery with a top portion and a bottom portion;

wherein at least a portion of said bottom portion of said outer periphery of said first shroud member has a shape that is complementary to at least a portion of a first side portion of said base portion of said second shroud member; and wherein at least a portion of said ring gear is disposed within said shroud.

2. The drive unit assembly of claim 1, wherein said first shroud member further comprises an attachment portion and said second shroud member further comprises an attachment portion;

wherein at least a portion of said attachment portion of said first shroud member is integrally connected to at least a portion of a first differential bearing cap and/or at least a portion of an inner surface of a housing of said drive unit assembly; and wherein at least a portion of said attachment portion of said second shroud member is integrally connected to at least a portion of a second differential bearing cap and/or at least a portion of said inner surface of said housing.

3. The drive unit assembly of claim 1, wherein said base portion of said second shroud member further comprises a shroud attachment portion; and wherein at least a portion of said shroud attachment portion circumferentially extends inboard from at least a portion of said first side portion of said base portion of said second shroud member toward said ring gear.

4. The drive unit assembly according of claim 3, wherein at least a portion of said bottom portion of said outer periphery of said first shroud member is disposed directly adjacent to an inner surface of said shroud attachment portion of said base portion of said second shroud member;

wherein at least a portion of said first shroud member is disposed directly adjacent to at least a portion of said second side of said ring gear; and wherein at least a portion of said outer surface of said first shroud member is integrally connected to at least a portion of said shroud attachment portion of said base portion of said second shroud member forming a unitary shroud.

5. The drive unit assembly of claim 3, wherein said second portion of said attachment portion of said first shroud member comprises an attachment arm;

wherein said attachment arm of said second portion of said attachment portion of said first shroud member extends toward said first portion of said attachment portion of said first shroud member;

wherein said attachment arm comprises a seventh substantially straight portion, a sixth angularly bent portion, an eighth substantially straight portion, a seventh angularly bent portion and/or a ninth substantially straight portion;

wherein said eighth substantially straight portion extends outboard from said sixth angularly bent portion toward said base portion of said second shroud member; and wherein said eighth substantially straight portion is substantially perpendicular to said ninth substantially straight portion of said second portion of said attachment portion of said first shroud member.

6. The drive unit assembly of claim 1, wherein at least a portion of a first end portion of said base portion of said first shroud member extends around said outermost surface of said ring gear to an angle θ3 above a horizontal center-line C1; and/or wherein at least a portion of a second end of said base portion of said second shroud member is disposed directly adjacent to at least a portion of a pinion gear.

7. The drive unit assembly of claim 6, wherein said base portion of said second shroud member further comprises a pinion gear receiving portion; and wherein said pinion gear receiving portion has a size and shape to receive at least a portion of said pinion gear.

8. The drive unit assembly of claim 6, wherein said second shroud member further comprises a first substantially straight portion;

wherein said first substantially straight portion circumferentially extends inboard from at least a portion of a second side portion of said base portion of said second shroud member toward said ring gear; and wherein at least a portion of said first substantially straight portion of said second shroud member is disposed outboard from and directly adjacent to at least a portion of said first side of said ring gear.

9. The drive unit assembly of claim 8, wherein said second shroud member further comprises a first substantially arcuate portion, wherein said first substantially arcuate portion extends from an end of said first substantially straight portion of said second shroud member opposite said base portion of said second shroud member, and wherein said first substantially arcuate portion extends outboard away from said ring gear; and/or wherein said second shroud member further comprises a second angularly bent portion, and wherein said second angularly bent portion extends from an end of said second substantially straight portion opposite said first angularly bent portion.

10. The drive unit assembly of claim 8, wherein said second shroud member further comprises a second substantially straight portion;

wherein said second substantially straight portion of said second shroud member extends from an end of a first angularly bent portion opposite said first substantially straight portion of said second shroud member; and wherein said second substantially straight portion of said second shroud member extends substantially perpendicular to said first substantially straight portion of said second shroud member.

11. The drive unit assembly of claim 10, wherein said second shroud member further comprises a third substantially straight portion;

wherein said third substantially straight portion of said second shroud member extends inboard from an end of a second angularly bent portion opposite said second substantially straight portion of said second shroud member; and wherein at least a portion of said third substantially straight portion of said second shroud member is disposed directly adjacent to said first side of said ring gear.

12. The drive unit assembly of claim 1, wherein said top portion of said outer periphery of said first shroud member comprises a first end portion, a second end portion and an intermediate portion interposed between said first and second end portions;

wherein said first end portion of said top portion of said outer periphery comprises a fourth substantially straight portion; and wherein said fourth substantially straight portion of said first shroud member extends at an angle θ1 away from said ring gear.

13. The drive unit assembly of claim 12, wherein said second end portion of said top portion of said outer periphery of said first shroud member comprises a fifth substantially straight portion, a fourth angularly bent portion and sixth substantially straight portion;

wherein said fifth substantially straight portion is connected to an end of said fourth angularly bent portion opposite said sixth substantially straight portion; and wherein said fifth substantially straight portion extends at an angle θ2 away from said ring gear.

14. The drive unit assembly of claim 12, wherein said intermediate portion of said top portion of said outer periphery of said first shroud member comprises said attachment portion of said first shroud member;

wherein said attachment portion of said first shroud member comprises a first portion and a second portion extending outboard away from said ring gear from a fifth angularly bent portion;

wherein said fifth angularly bent portion is connected to an end of said fourth substantially straight portion of said first shroud member opposite said base portion of said second shroud member; and wherein said first and second portions of said attachment portion of said first shroud member are separated from each other by a gap.

15. The drive unit assembly of claim 12, wherein said intermediate portion of said top portion of said outer periphery of said first shroud member comprises a first substantially concave portion, a second substantially concave portion, a twelfth substantially straight portion and a thirteenth substantially straight portion;

wherein said first substantially concave portion is connected to an end of said tenth substantially straight portion of said first shroud member opposite said base portion of said second shroud member;

wherein said second substantially concave portion is connected to an end of said eleventh substantially straight portion of said first shroud member opposite said base portion of said second shroud member;

wherein said twelfth substantially straight portion extends from an end of said first substantially concave portion opposite said tenth substantially straight portion of said first shroud member; and wherein said thirteenth substantially straight portion extends from an end of said second substantially concave portion opposite said eleventh substantially straight portion of said first shroud member.

16. The drive unit assembly of claim 15, wherein at least a portion of said first substantially concave portion and/or at least a portion of said second substantially concave portion of said first shroud member extend inward toward said ring gear;

wherein at least a portion of said first substantially concave portion is connected to at least a portion of said second substantially concave portion at a point within said body portion of said first shroud member; and wherein at least a portion of said twelfth substantially straight portion is connected to at least a portion of said thirteenth substantially straight portion at a point within said body portion of said first shroud member.

17. The drive unit assembly of claim 15, wherein said twelfth and thirteenth substantially straight portions of said first shroud member form a substantially conical shape, a substantially truncated conical shape, a substantially frustum shape or a substantially frusto-conical shape.

18. The drive unit assembly of claim 15, wherein said twelfth and thirteenth substantially straight portions of said first shroud member form one or more differential shield portions that is disposed outboard from and directly adjacent to at least a portion of one or more apertures extending from an inner surface to an outer surface of a differential case; and/or wherein said one or more differential shield portions of said first shroud member prevents an amount of lubrication fluid in a primary sump to come into contact with the differential case and/or a differential gear set disposed within the differential case; and/or wherein said one or more differential shield portions of said first shroud member collects an amount of lubrication fluid expelled from the differential case and directs said lubrication fluid collected to a secondary sump within said shroud assembly.

19. The drive unit assembly according of claim 1, wherein said bottom portion of said outer periphery of said first shroud member comprises a shroud attachment portion;

wherein at least a portion of said shroud attachment portion of said first shroud member is disposed outboard from at least a portion of said first side portion of said base portion of said second shroud member; and wherein at least a portion of said shroud attachment portion of said first shroud member is integrally connected to at least a portion of said first side portion of said base portion of said second shroud member forming a unitary shroud.

20. The drive unit assembly of claim 1, wherein said first end portion of said top portion of said outer periphery of said first shroud member comprises a tenth substantially straight portion extending from said ring gear at an angle θ4; and wherein said second end portion of said top portion of said first shroud member comprises an eleventh substantially straight portion extending from said ring gear at an angle θ5.

* * * * *

UNITED STATES PATENT AND TRADEMARK OFFICE
CERTIFICATE OF CORRECTION

PATENT NO. : 11,125,316 B2  
APPLICATION NO. : 16/980453  
DATED : September 21, 2021  
INVENTOR(S) : Carmean et al.

Page 1 of 1

It is certified that error appears in the above-identified patent and that said Letters Patent is hereby corrected as shown below:

In the Claims

Claim 8, Column 36, Line 12, should read "The drive unit assembly of claim 1, wherein said"

Signed and Sealed this  
Twenty-eighth Day of December, 2021

Drew Hirshfeld  
*Performing the Functions and Duties of the*  
*Under Secretary of Commerce for Intellectual Property and*  
*Director of the United States Patent and Trademark Office*